United States Patent
Nakayama et al.

(10) Patent No.: US 12,166,410 B2
(45) Date of Patent: Dec. 10, 2024

(54) POWER CONVERSION DEVICE

(71) Applicant: Mitsubishi Electric Corporation, Tokyo (JP)

(72) Inventors: Akito Nakayama, Tokyo (JP); Takuya Kajiyama, Tokyo (JP); Miwako Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 193 days.

(21) Appl. No.: 17/928,940

(22) PCT Filed: Jul. 28, 2020

(86) PCT No.: PCT/JP2020/028887
§ 371 (c)(1),
(2) Date: Dec. 1, 2022

(87) PCT Pub. No.: WO2022/024218
PCT Pub. Date: Feb. 3, 2022

(65) Prior Publication Data
US 2023/0231467 A1    Jul. 20, 2023

(51) Int. Cl.
*H02M 1/12* (2006.01)
*H02M 1/00* (2007.01)
(Continued)

(52) U.S. Cl.
CPC ....... *H02M 1/0074* (2021.05); *H02M 1/0025* (2021.05); *H02M 1/08* (2013.01);
(Continued)

(58) Field of Classification Search
CPC ............. H02M 1/0003; H02M 1/0025; H02M 1/0043; H02M 1/007; H02M 1/12;
(Continued)

(56) References Cited

U.S. PATENT DOCUMENTS 9,590,483 B1 *   3/2017  Basic ............... H02M 1/088
2014/0002048 A1 * 1/2014  Pang .............. H02M 7/4835
                                              323/304
(Continued)

FOREIGN PATENT DOCUMENTS

CN      110829870 A  *  2/2020  ........... H02M 7/483
EP        2560275 A1     2/2013
(Continued)

OTHER PUBLICATIONS

International Search Report and Written Opinion mailed on Oct. 13, 2020, received for PCT Application PCT/JP2020/028887, filed on Jul. 28, 2020, 9 pages including English Translation.
(Continued)

*Primary Examiner* — Thienvu V Tran
*Assistant Examiner* — Shahzeb K Ahmad
(74) *Attorney, Agent, or Firm* — XSENSUS LLP

(57) ABSTRACT

A power converter includes two arms for each phase between DC terminals, and each arm is formed by connecting a plurality of converter cells in series. A control device includes an arm voltage command generation unit which generates, for each arm, an arm voltage command for the plurality of converter cells. The arm voltage command is generated by superimposing a zero-phase-sequence voltage command having a frequency component that is three times an AC fundamental frequency. Phase adjustment of the zero-phase-sequence voltage command is performed on the basis of voltage of a DC capacitor in the converter cell and the arm voltage command.

19 Claims, 21 Drawing Sheets

(51) Int. Cl.
    *H02M 1/08*     (2006.01)
    *H02M 7/483*     (2007.01)
    *H02M 7/49*     (2007.01)
    *H02M 7/537*     (2006.01)
    *H02M 7/5387*     (2007.01)

(52) U.S. Cl.
    CPC ......... *H02M 1/123* (2021.05); *H02M 7/4835* (2021.05); *H02M 7/49* (2013.01); *H02M 7/537* (2013.01); *H02M 7/53873* (2013.01)

(58) Field of Classification Search
    CPC .......... H02M 1/123; H02M 1/32; H02M 1/36; H02M 7/483; H02M 7/4833; H02M 7/4835; H02M 7/4837; H02M 7/538; H02M 7/5387; H02M 7/5373
    See application file for complete search history.

(56) References Cited

U.S. PATENT DOCUMENTS

2018/0287509 A1* 10/2018 Fujii ................... H02M 7/4835
2019/0044427 A1   2/2019 Fujii et al.
2019/0199213 A1* 6/2019 Jaldanki ............. H02M 7/4835

FOREIGN PATENT DOCUMENTS

| | | |
|---|---|---|
| JP | 2011-223761 A | 11/2011 |
| JP | 2017-153355 A | 8/2017 |
| JP | 2018-014860 A | 1/2018 |
| WO | 2017/046908 A1 | 3/2017 |
| WO | WO-2018068843 A1 * | 4/2018 |

OTHER PUBLICATIONS

Notice of Reasons for Refusal mailed on Dec. 22, 2020, received for JP Application 2020-565909, 7 pages including English Translation.
Extended European search report dated Aug. 24, 2023 of the corresponding European patent application No. EP20946645.7, 9pp.

* cited by examiner

FIG. 16

| PH | σU1<br>FIRST ARM | σL1<br>THIRD ARM | σU2<br>SECOND ARM | σL2<br>FOURTH ARM |
|---|---|---|---|---|
| 0 | Pw | Nw | Nu | Pu |
| 1 | Nv | Pv | Pw | Nw |
| 2 | Pu | Nu | Nv | Pv |
| 3 | Nw | Pw | Pu | Nu |
| 4 | Pv | Nv | Nw | Pw |
| 5 | Nu | Pu | Pv | Nv |

POWER CONVERSION DEVICE

CROSS-REFERENCE TO RELATED APPLICATION

The present application is based on PCT filing PCT/JP2020/028887, filed Jul. 28, 2020, the entire contents of which are incorporated herein by reference.

TECHNICAL FIELD

The present disclosure relates to a power conversion device.

BACKGROUND ART

In recent years, in power conversion devices used for high-voltage application such as a power grid, a multilevel converter in which a plurality of converter cells each including an energy storage element are connected in series in a multiplexed manner, has been put into practice. Such a converter is called a modular multilevel converter (MMC) type, a cascaded multilevel converter (CMC) type, or the like.

In a conventional power conversion device that converts three-phase AC power using a general inverter/converter as described in, for example. Patent Document 1, when imbalance of a power grid is detected, a sinusoidal base signal is generated for each phase, and a third-order harmonic is superimposed on each base signal, to generate a voltage command signal for each phase. Thus, the peak of the voltage command is reduced, whereby utilization of DC voltage can be improved.

Meanwhile, a conventional power conversion device described in Patent Document 2 is a power conversion device of the MMC type and outputs zero-phase-sequence voltage with a third-order harmonic of a fundamental wave superimposed thereon to an AC circuit as in the control described in Patent Document 1.

CITATION LIST

Patent Document

Patent Document 1: Japanese Laid-Open Patent Publication No. 2018-14860
Patent Document 2: WO2017/046908

SUMMARY OF THE INVENTION

Problems to be Solved by the Invention

In the above conventional power conversion device of the MMC type, a different capacitor is provided for each arm, and power pulsation of each arm flows in/out to/from each capacitor. Therefore, depending on the capacitances of the capacitors or the operation condition, voltage pulsation might occur in the capacitors of each arm, thus hampering improvement in utilization of DC voltage.

The present disclosure has been made to solve the above problem, and an object of the present disclosure is to provide a power conversion device of the MMC type that can assuredly improve utilization of DC voltage.

Solution to the Problems

A power conversion device according to the present disclosure includes: a power converter for performing power conversion between a DC circuit and a three-phase AC circuit and a control device for performing output control of the power converter. The power converter includes, for each phase of the three-phase AC circuit, two arms provided between common DC terminals and connected to each other, a connection portion therebetween being connected to the corresponding phase of the three-phase AC circuit, each of the arms being formed by connecting, in series, a plurality of converter cells each composed of a plurality of semiconductor switching elements and a DC capacitor. The control device includes a voltage command generation unit which generates, for each of the arms of the power converter, an output voltage command for the plurality of converter cells, and the control device generates, for each of the arms, a base command for output voltage of the plurality of converter cells, performs phase adjustment of a zero-phase-sequence voltage command having a frequency component that is three times a fundamental frequency of the three-phase AC circuit on the basis of voltage of the DC capacitor and the output voltage command, and superimposes the phase-adjusted zero-phase-sequence voltage command on the base command, thus generating the output voltage command.

Effect of the Invention

The power conversion device according to the present disclosure makes it possible to provide a power conversion device of the MMC type that can assuredly improve utilization of DC voltage.

BRIEF DESCRIPTION CF THE DRAWINGS

Figure 3:
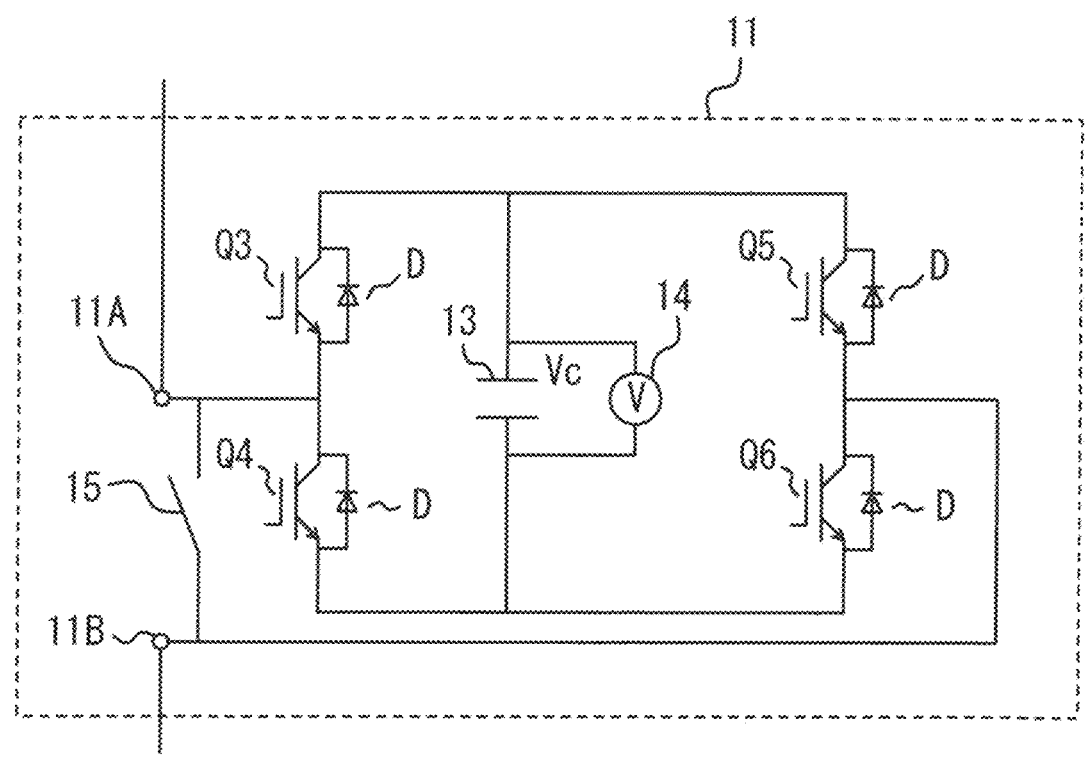

FIG. 3 shews a configuration example of a converter cell according to embodiment 1.

Figure 4:
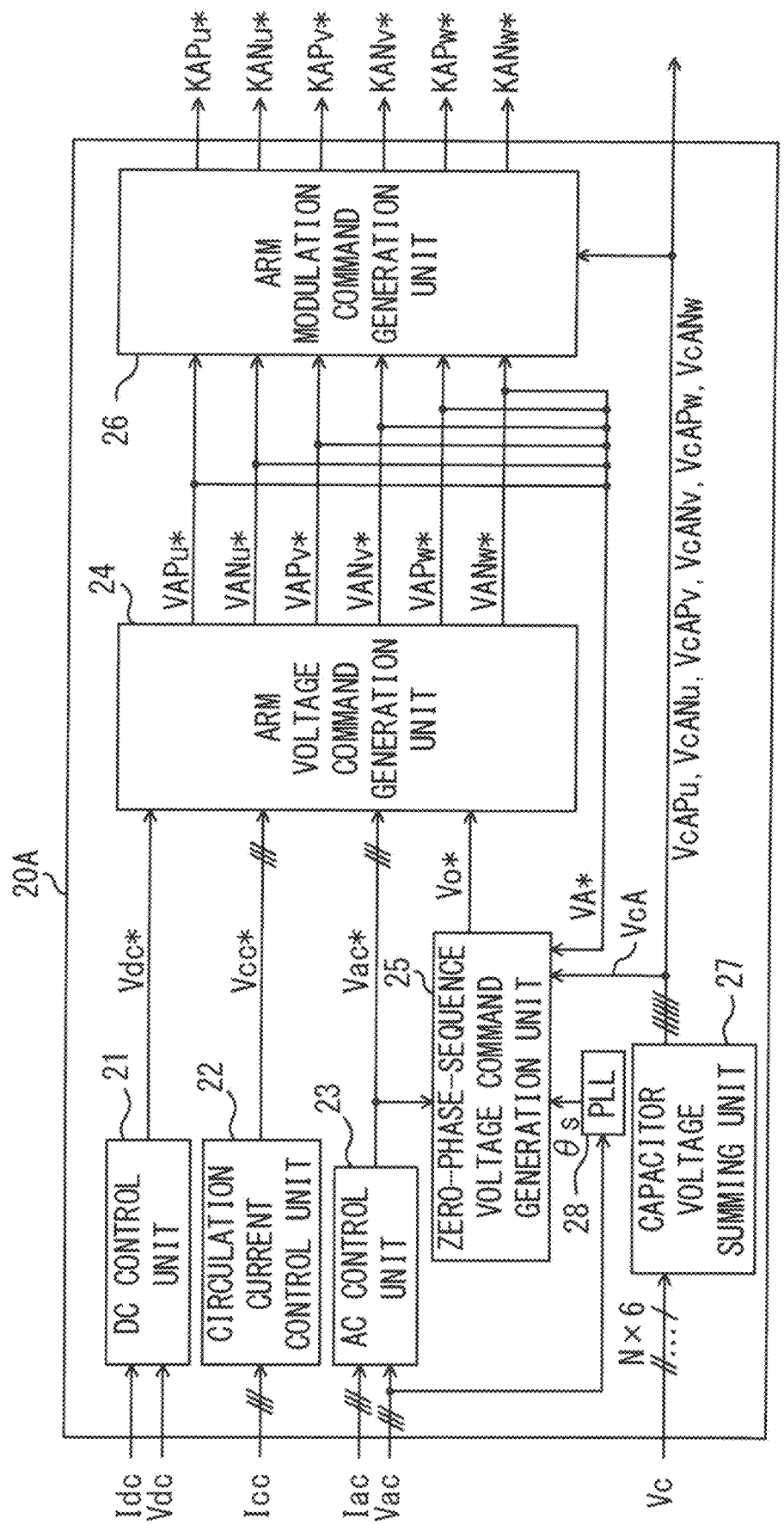

FIG. 4 is a block diagram showing a main control unit of a control device according to embodiment 1.

Figure 5:
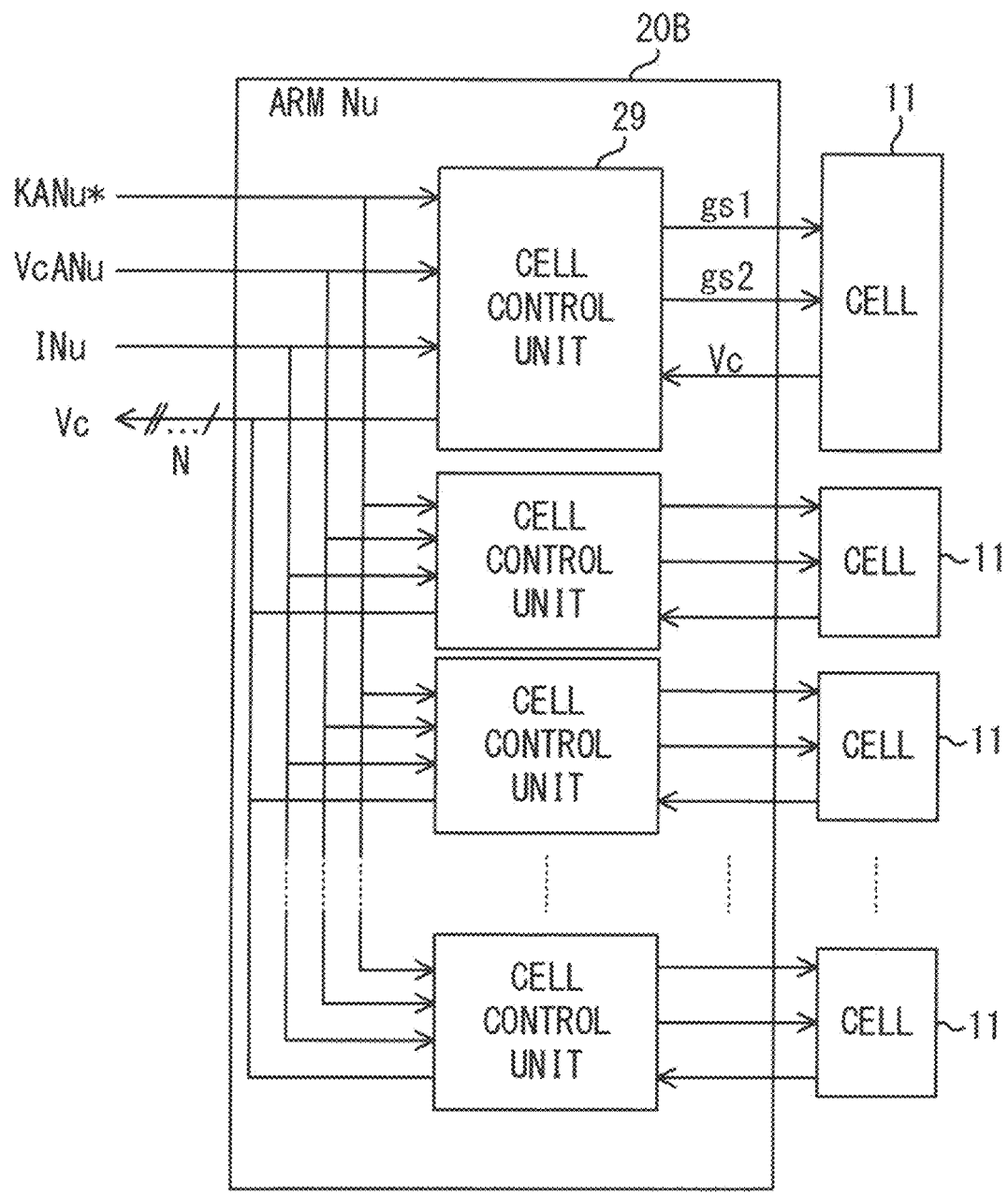

FIG. 5 is a block diagram showing an arm control unit of the control device according to embodiment 1.

Figure 6:
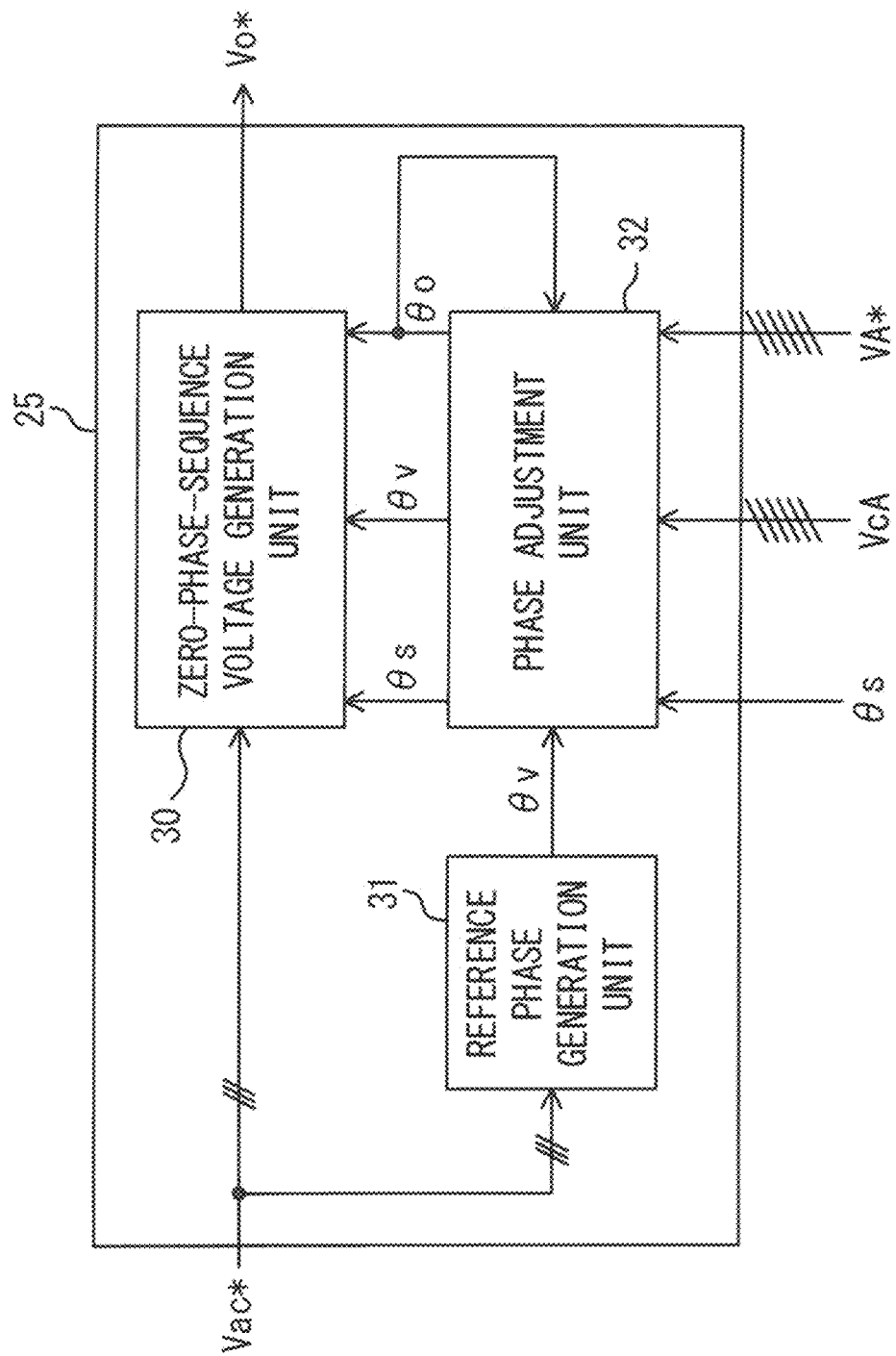

FIG. 6 is a block diagram showing a zero-phase-sequence voltage command generation unit according to embodiment 1.

Figure 7:
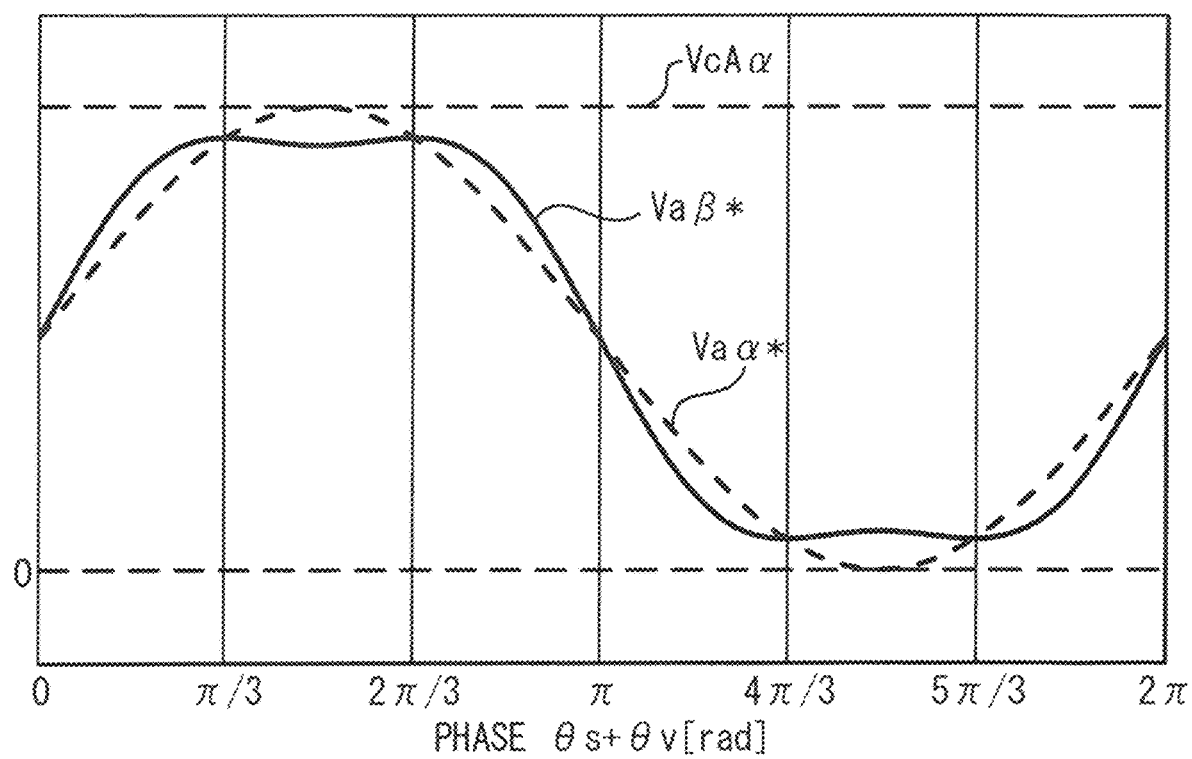

FIG. 7 is a waveform diagram showing the relationship between a capacitor voltage sum for an arm and an arm voltage command in a first comparative example.

Figure 8:
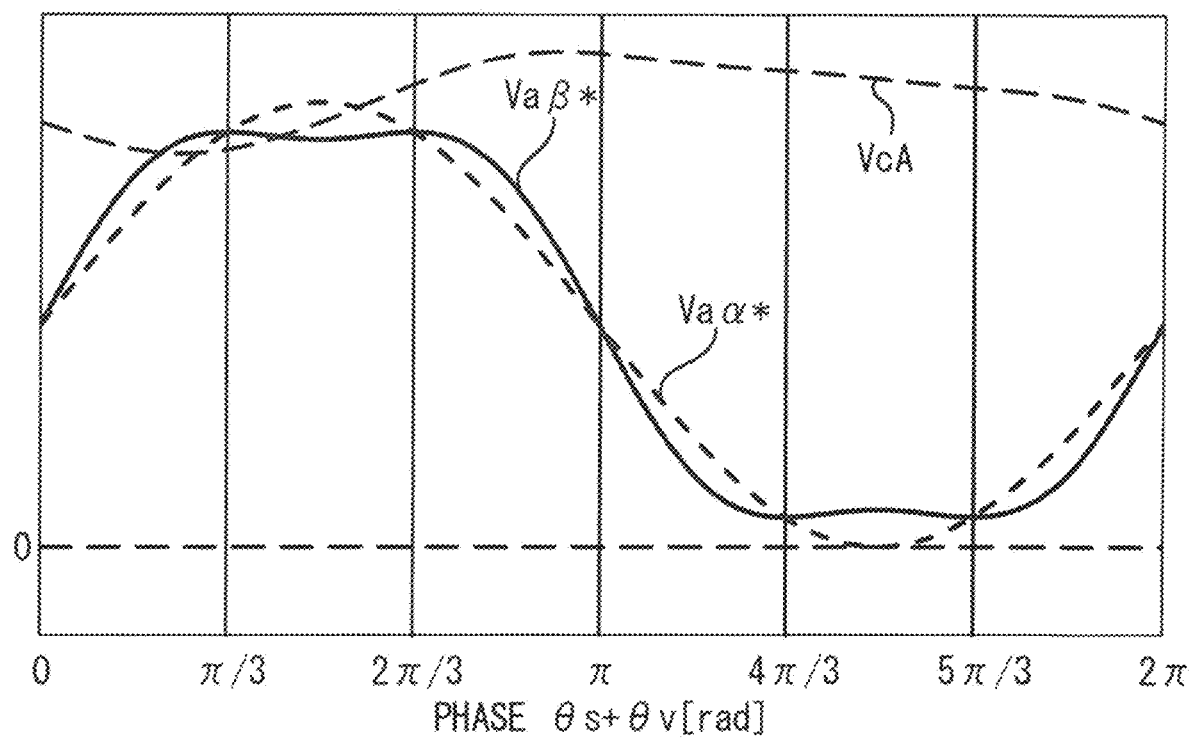

FIG. 8 is a waveform diagram showing the relationship between a capacitor voltage sum for an arm and an arm voltage command in a second comparative example.

Figure 9:
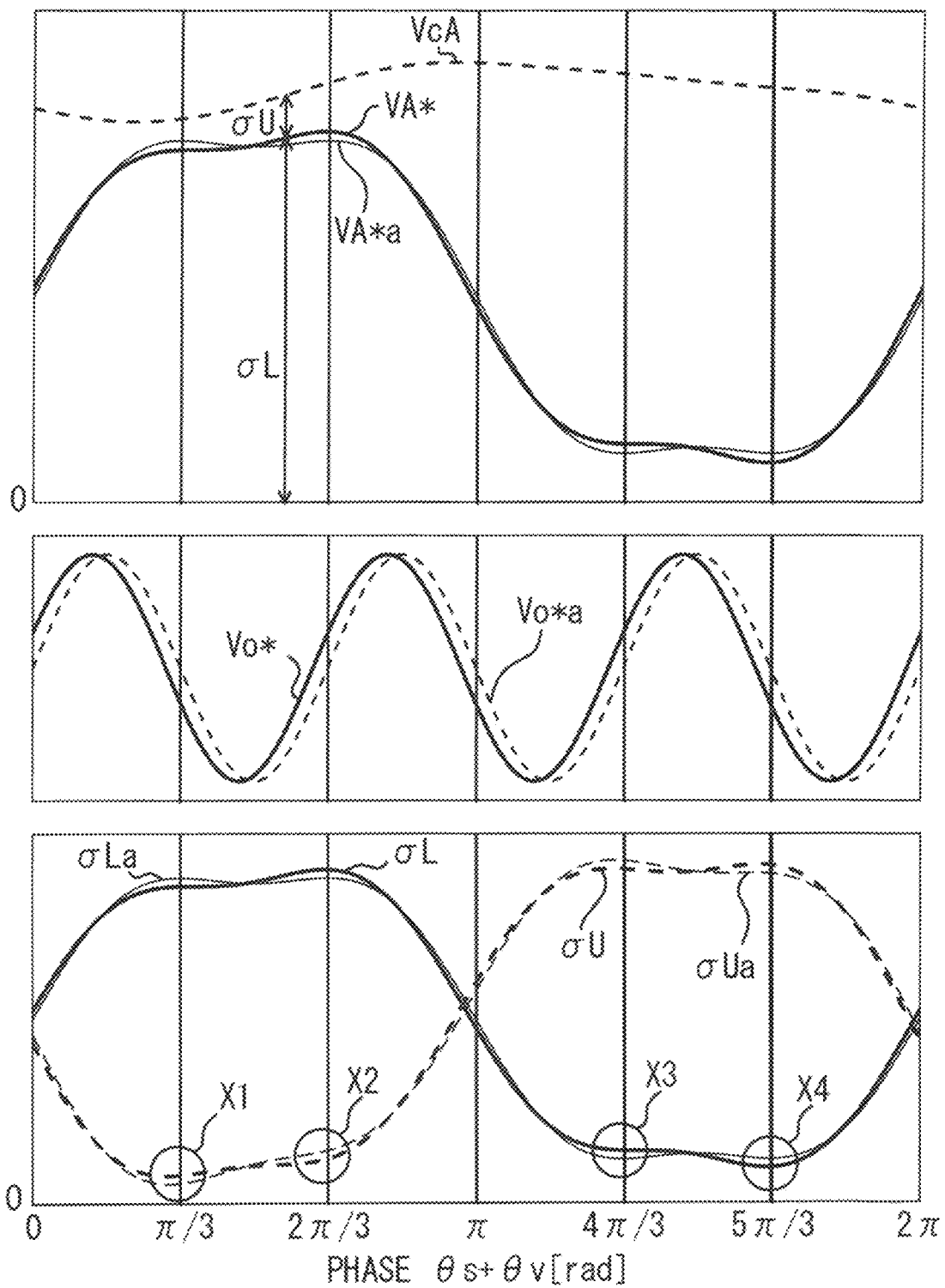

FIG. 9 is a waveform diagram at various parts, for illustrating operation of the power conversion device according to embodiment 1.

Figure 10:
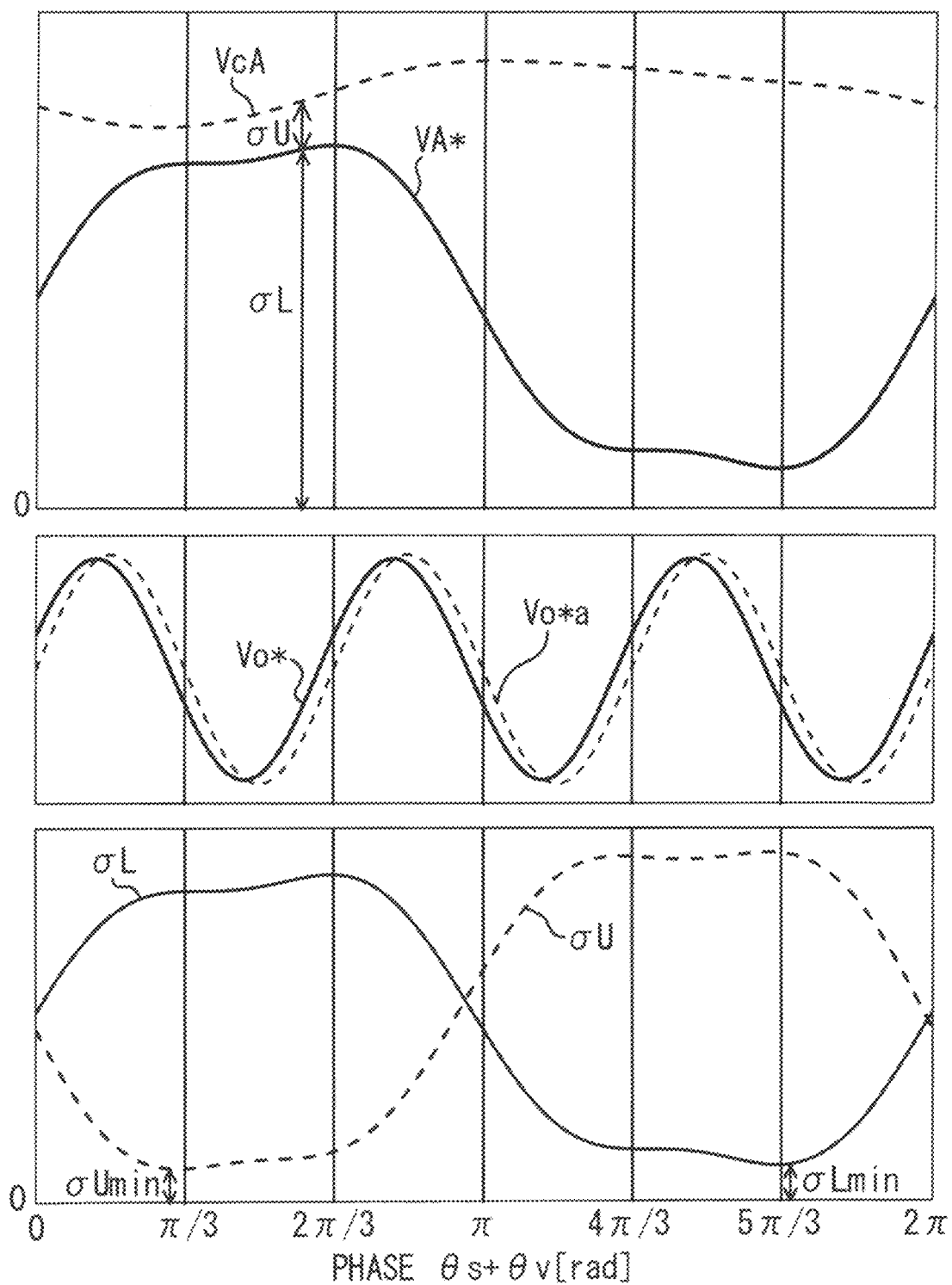

FIG. 10 is a waveform diagram at various parts, for illustrating operation of the power conversion device according to embodiment 1.

Figure 11:
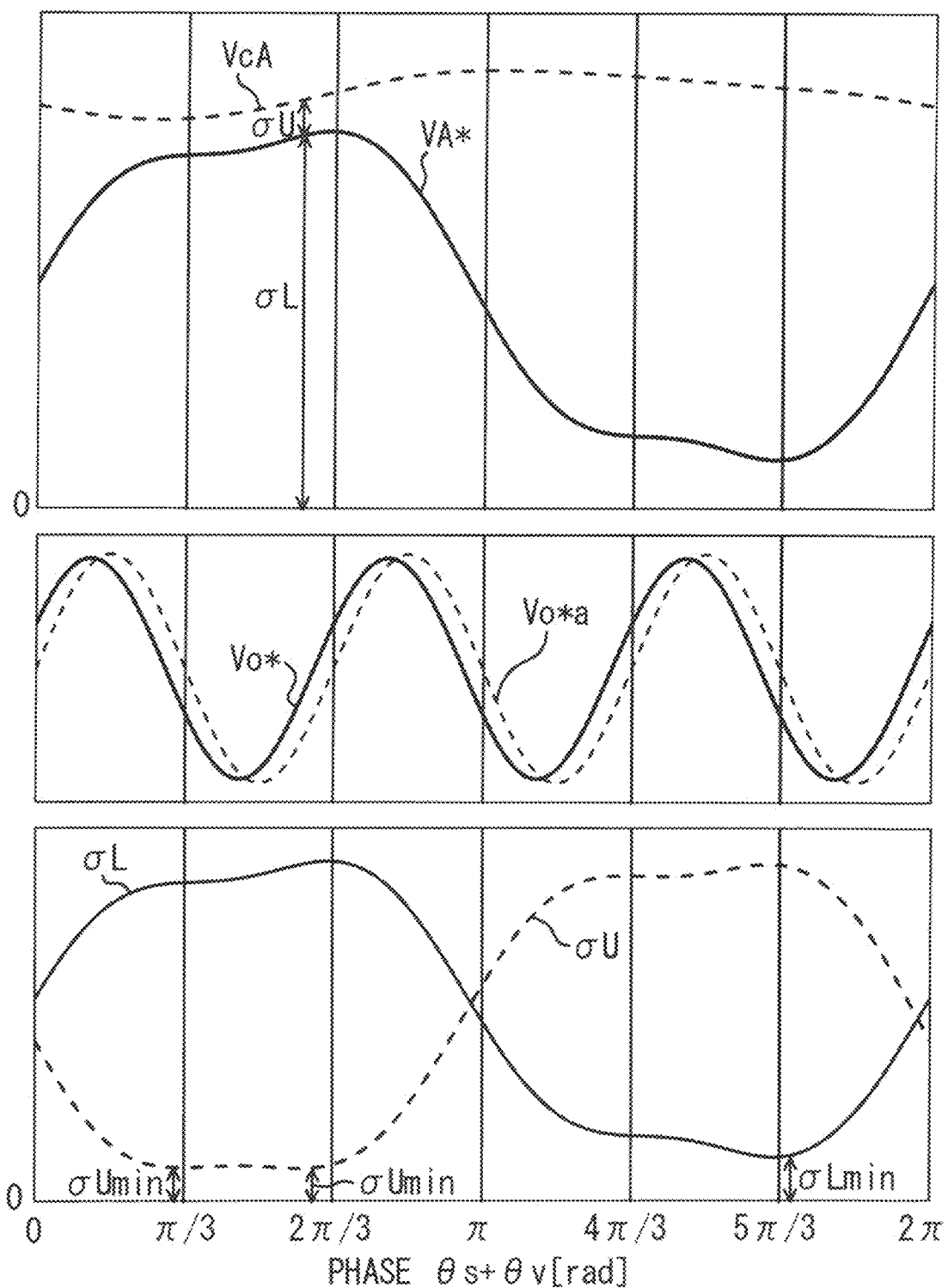

FIG. 11 is a waveform diagram at various parts, for illustrating operation of the power conversion device according to embodiment 1.

Figure 12:
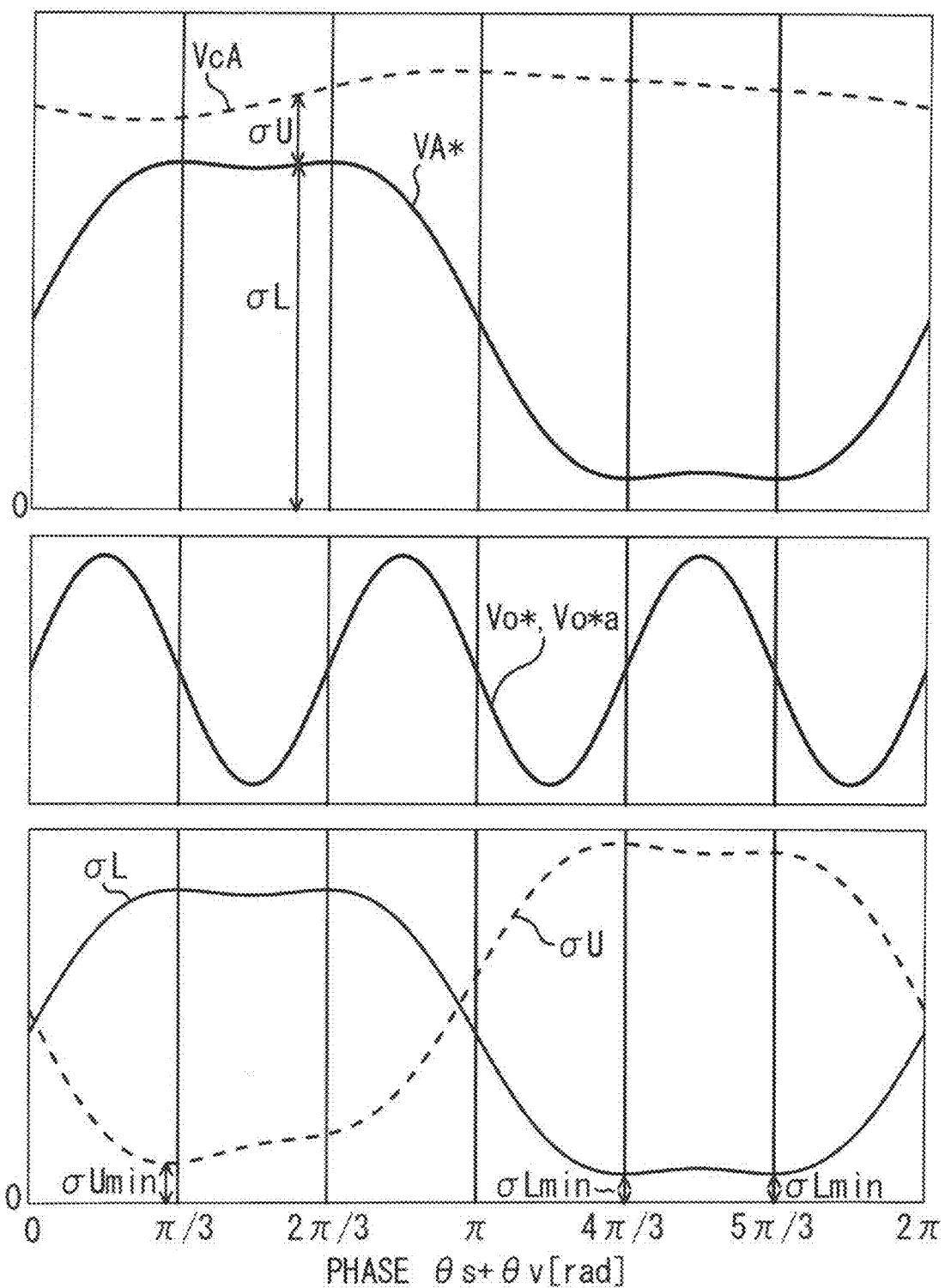

FIG. 12 is a waveform diagram at various parts, for illustrating operation of the power conversion device according to embodiment 1.

Figure 13:
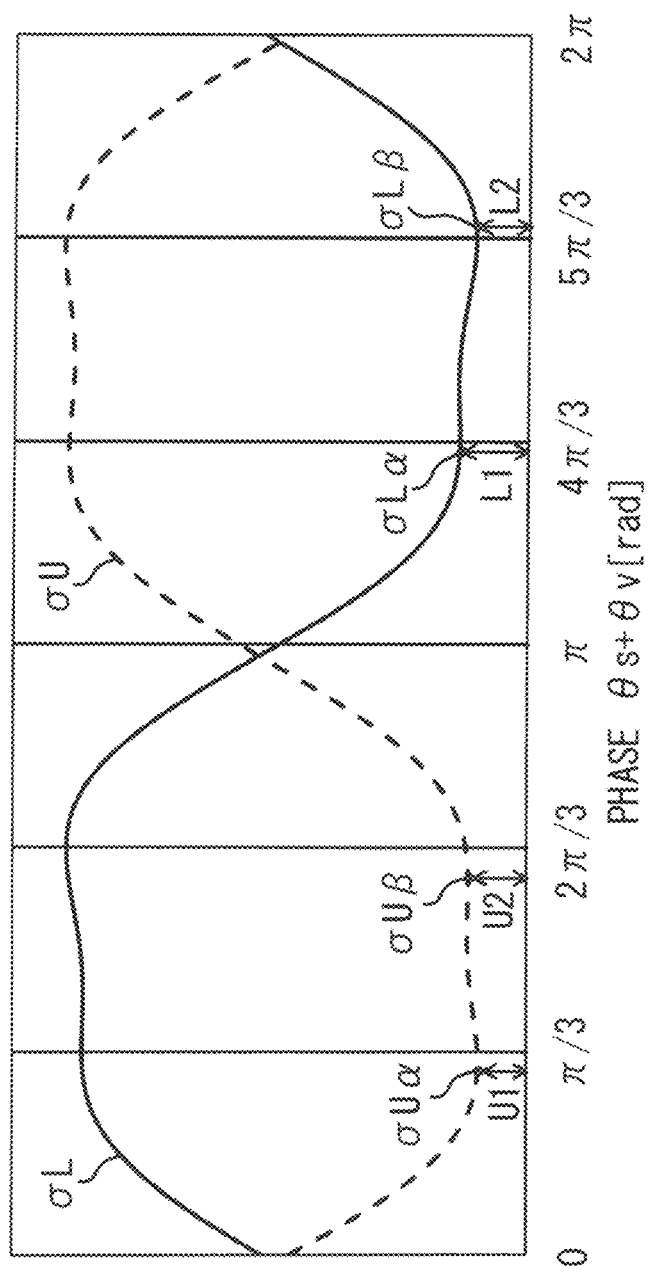

FIG. 13 is a waveform diagram showing an arm voltage command and a control margin according to embodiment 1.

Figure 14:
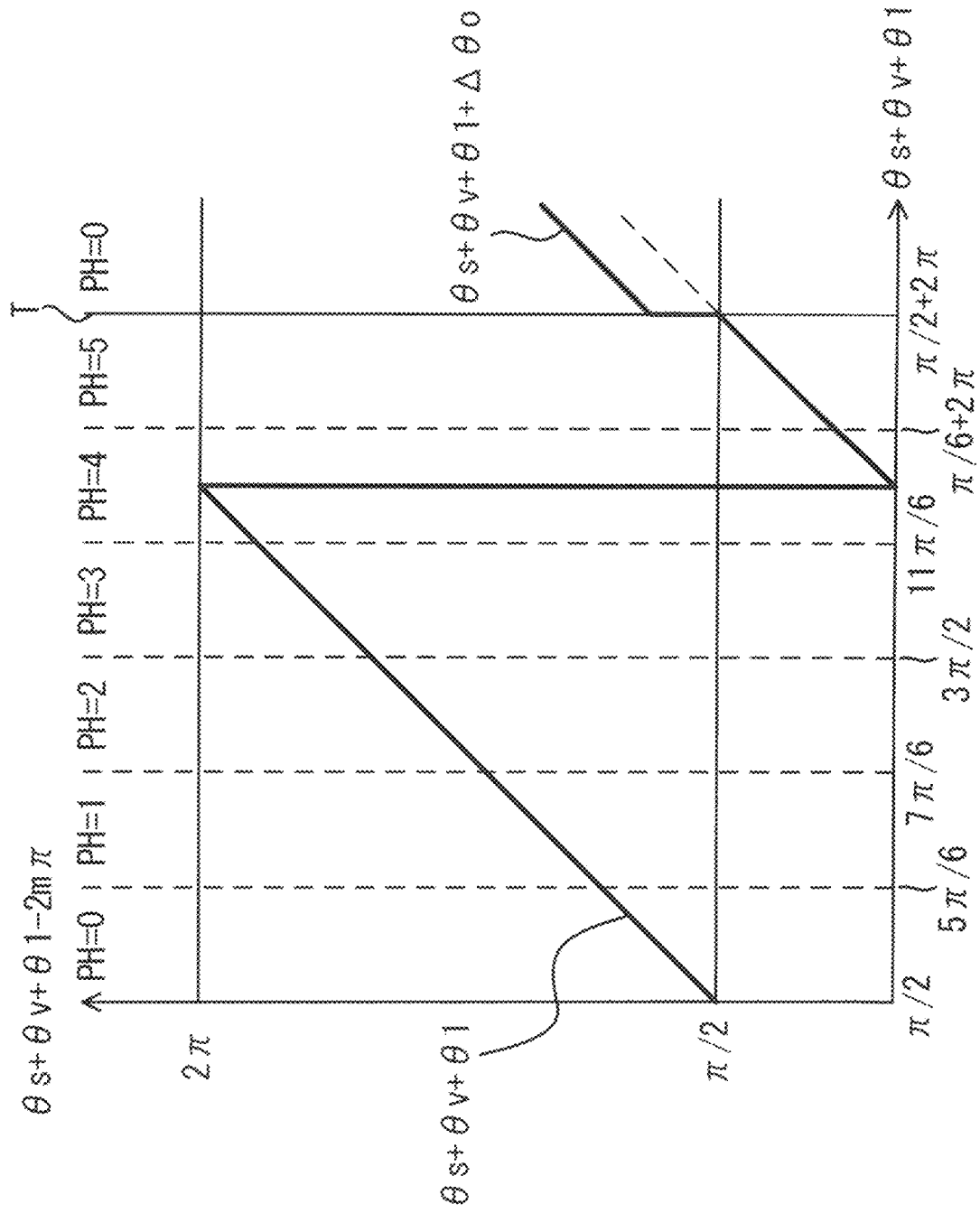

FIG. 14 is a waveform diagram showing detection sections and phase update of a zero-phase-sequence voltage command in a power conversion device according to embodiment 3.

Figure 15:
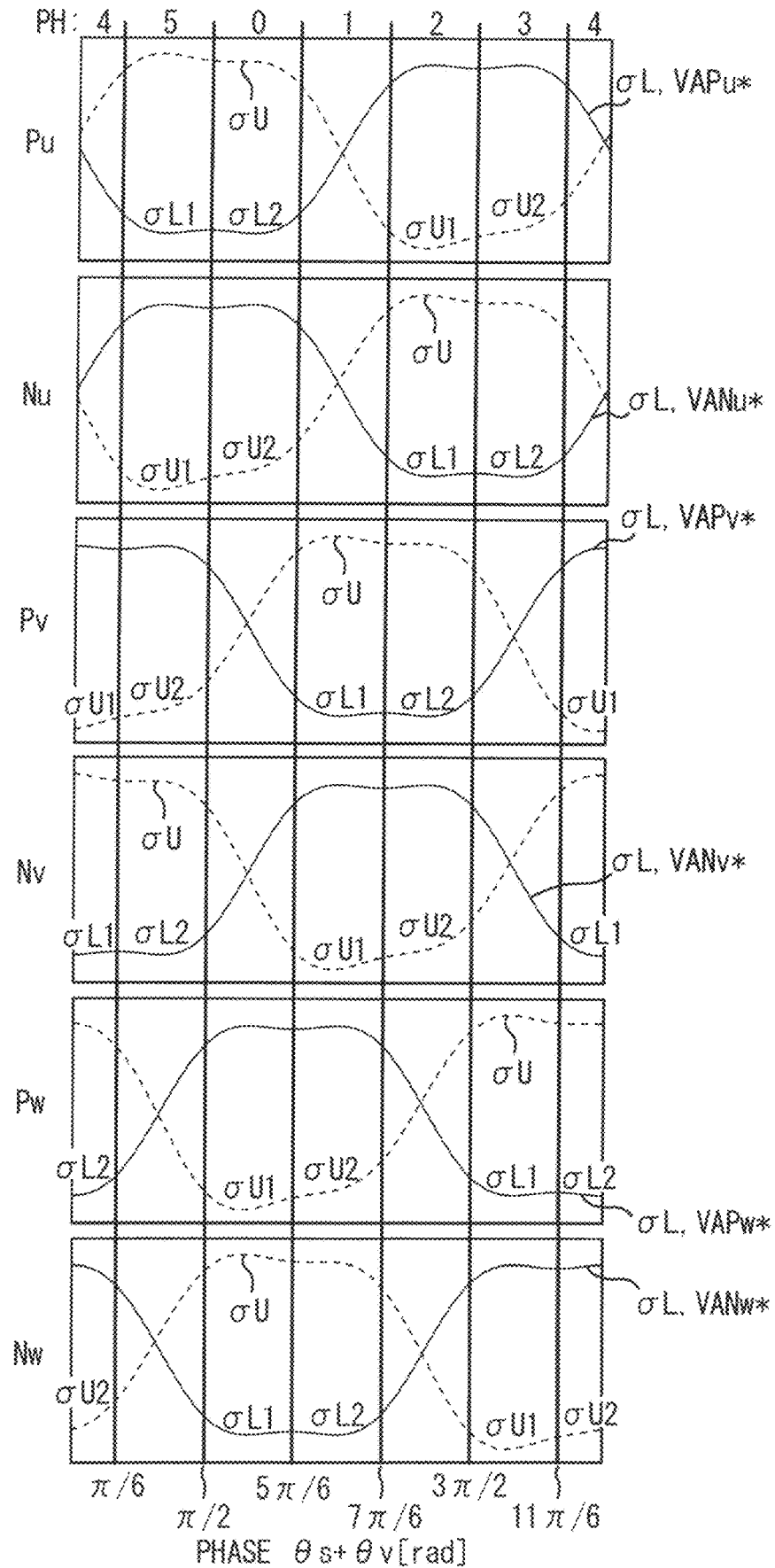

FIG. 15 is a waveform diagram showing an arm voltage command and a control margin for each arm in the power conversion device according to embodiment 3.

FIG. 16 shows detection arms set for each detection section in the power conversion device according to embodiment 3.

Figure 17:
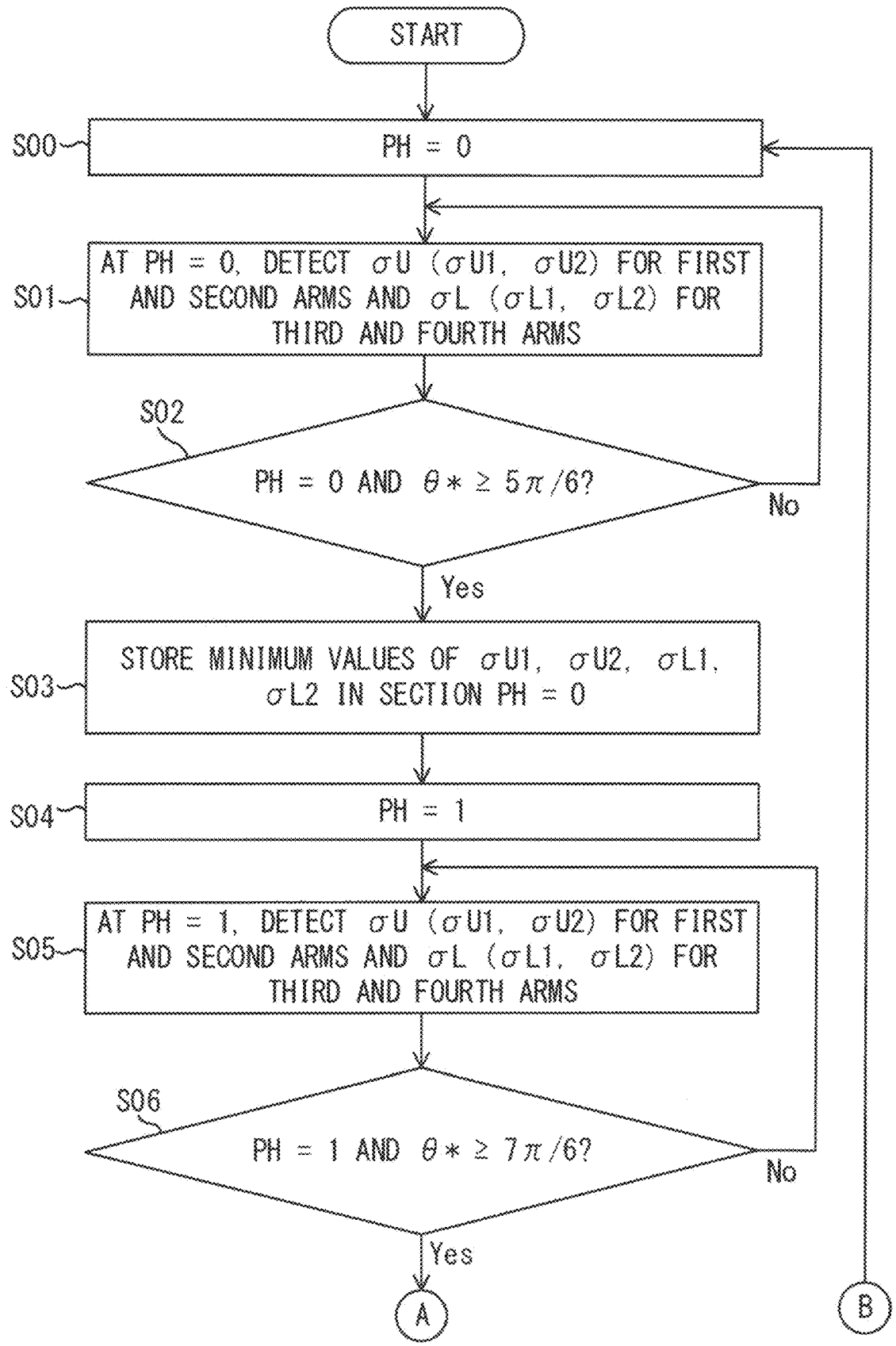

FIG. 17 is a flowchart illustrating operation of the power conversion device according to embodiment 3.

Figure 18:
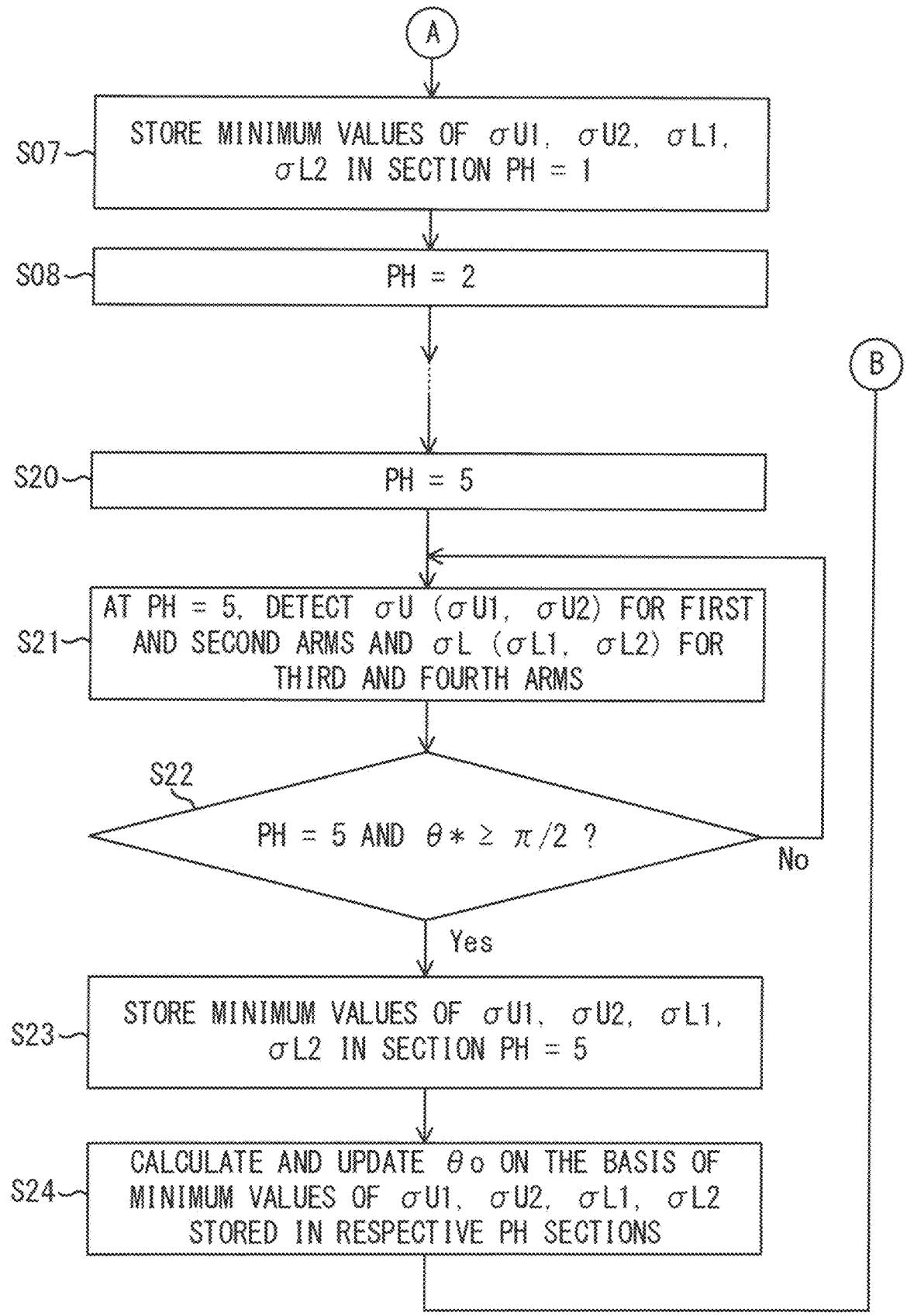

FIG. 18 is a flowchart illustrating operation of the power conversion device according to embodiment 3.

Figure 19:
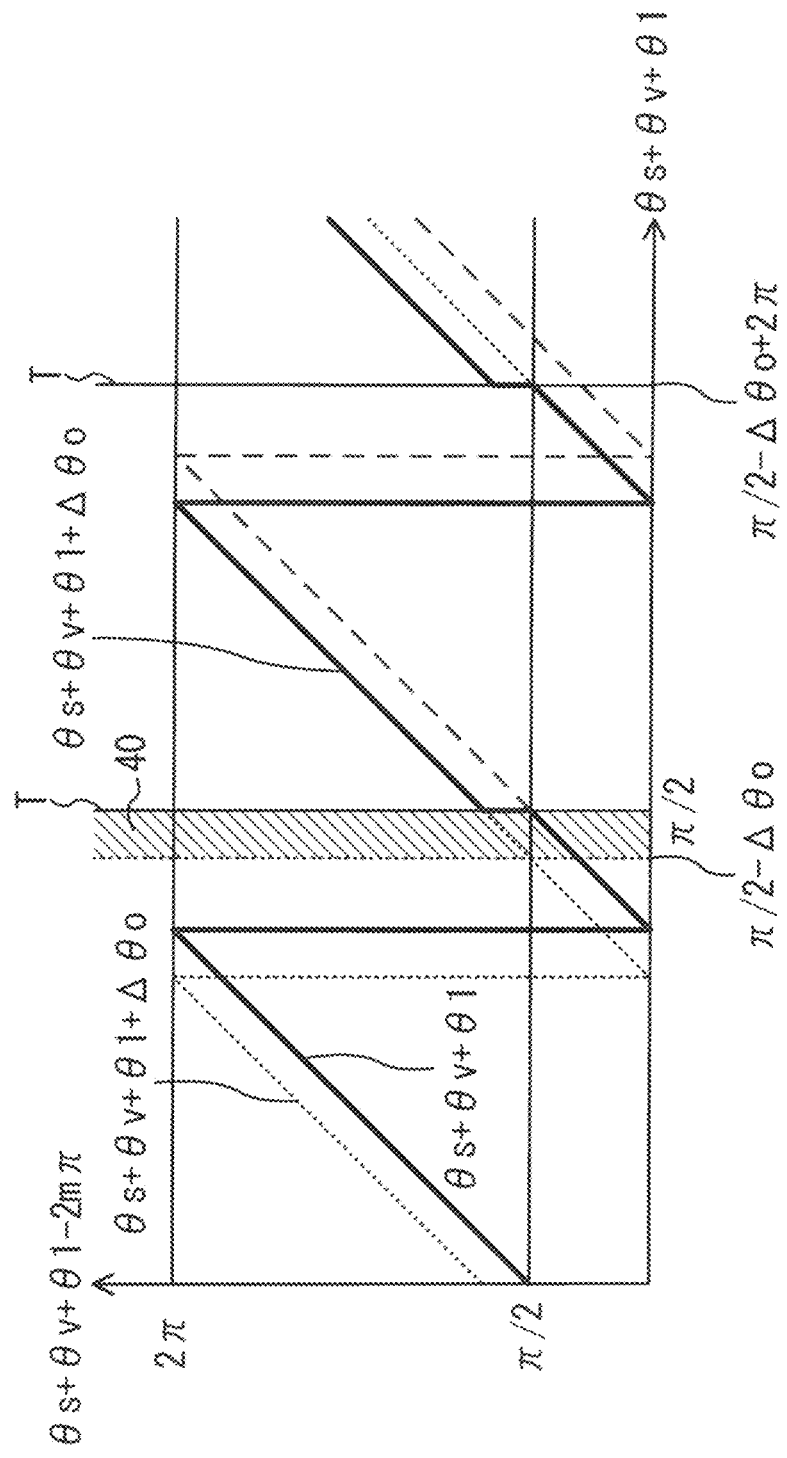

FIG. 19 is a waveform diagram showing phase update of a zero-phase-sequence voltage command in the power conversion device according to embodiment 3.

Figure 20:
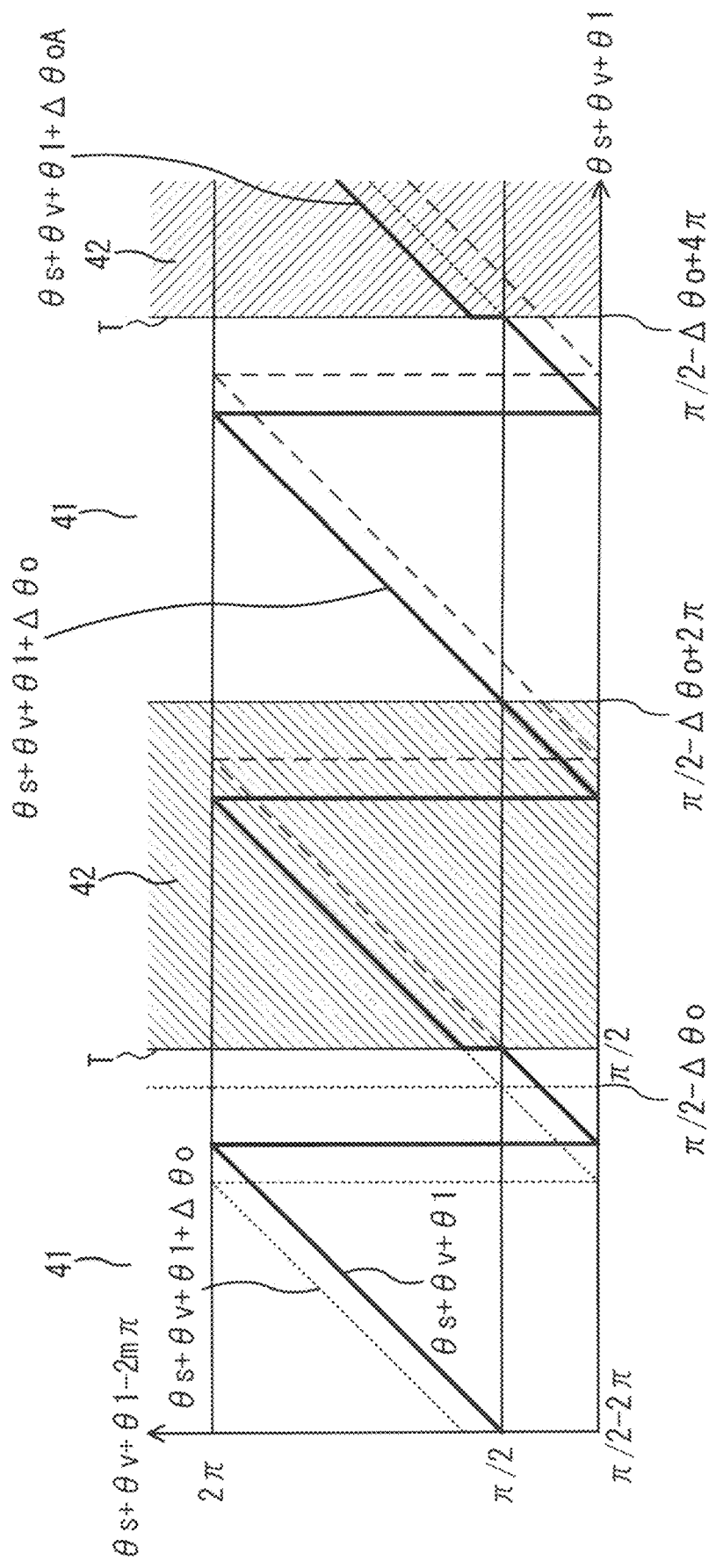

FIG. 20 is a waveform diagram showing phase update of a zero-phase-sequence voltage command in a power conversion device according to embodiment 4.

Figure 21:
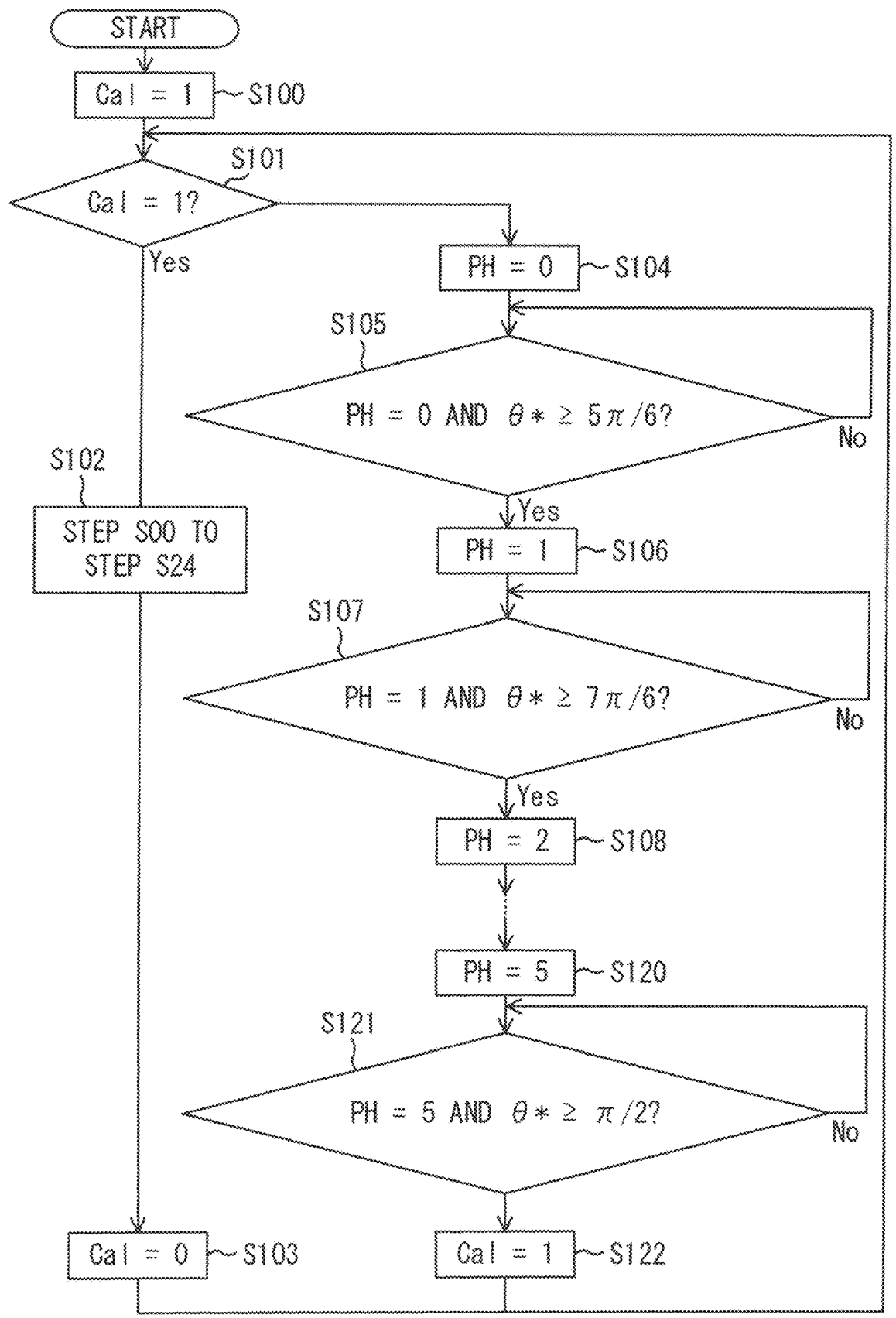

FIG. 21 is a flowchart illustrating operation of the power conversion device according to embodiment 4.

DESCRIPTION OF EMBODIMENTS

Embodiment 1

Figure 1:
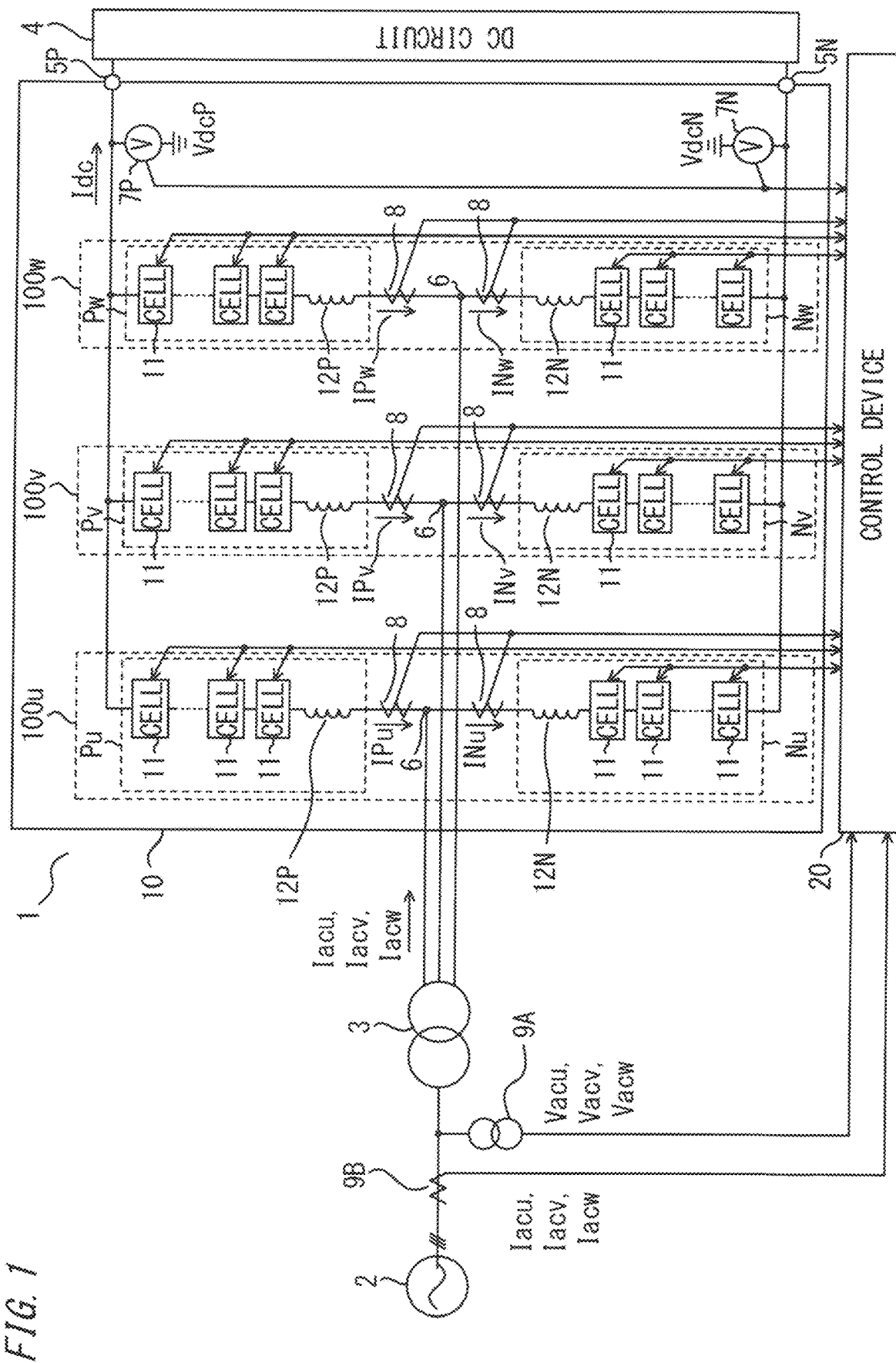
FIG. 1 shows a schematic configuration of a power conversion device according to embodiment 1.

FIG. 1 shows a schematic configuration of a power conversion device according to embodiment 1.

As shown in FIG. 1, a power conversion device 1 includes a power converter 10 which is a main circuit and a control device 20 for performing output control of the power converter 10, and is connected between an AC grid 2 as a three-phase AC circuit and a DC circuit 4.

The power converter 10 includes a plurality of leg circuits 100u, 100v, 100w (referred to as leg circuit(s) 100 when mentioning them collectively or any of them) connected in parallel to each other, between a positive DC terminal 5P and a negative DC terminal 5N which are common DC terminals.

The leg circuit 100 is provided for each of a plurality of phases (in this case, three phases U, V, W) forming AC. The leg circuits 100 are connected between the AC grid 2 and the DC circuit 4 and perform power conversion between AC and DC. AC input terminals 6 respectively provided to the leg circuits 100u, 100v, 100w are connected to the AC grid 2 via a transformer 3.

The positive DC terminal 5P and the negative DC terminal 5N connected in common to the leg circuits 100 are connected to the DC circuit 4. The DC circuit 4 is, for example, a DC power grid including a DC power transmission network and the like, or another power conversion device, in the former case, a high-voltage DC power transmission (HVDC) system is formed. In the latter case, two power conversion devices are connected, thus forming a back-to-back (BTB) system for connecting two AC grids different in rated frequency or the like.

The leg circuit 100u includes a U-phase upper arm Pu from the positive DC terminal 5P to the AC input terminal 6, and a D-phase lower arm Nu from the negative DC terminal 5N to the AC input terminal 6. The leg circuit 100v includes a V-phase upper arm Pv from the positive DC terminal 5P to the AC input terminal 6, and a V-phase lower arm Nv from the negative DC terminal 5N to the AC input terminal 6. The leg circuit 100w includes a W-phase upper arm Pw from the positive DC terminal 5P to the AC input terminal 6, and a W-phase lower arm Nw from the negative DC terminal 5N to the AC input terminal 6.

That is, the upper arms Pu, Pv, Pw for the respective phases and the lower arms Nu, Nv, Nw for the respective phases are connected in series to each other, and the connection points therebetween serve as the AC input terminals 6 for the respective phases.

The leg circuits 100u, 100v, 100w have the same configuration. Therefore, hereinafter, the leg circuit 100u for U phase will be described as a representative.

The arm Pu is formed by connecting a plurality of (N) converter cells 11 and a reactor 12P in series. Similarly, the arm Nu is formed by connecting a plurality of (N) converter cells 11 and a reactor 12N in series.

The position where the reactor 12P is provided may foe any position in the arm Pu, and the position where the reactor 12N is provided may be any position in the arm Nu.

As each of the reactors 12P, 12N, a plurality of reactors may be provided, and the inductance values of the reactors may be different from each other. Only one of the reactors 12P, 12N may be provided and another one may be omitted.

Although the case where the AC input terminals 6 are connected to the AC grid 2 via the transformer 3 is shown here, a configuration in which the AC input terminals 6 are connected to the AC grid 2 via an interconnection reactor instead of the transformer 3, may be adopted.

Instead of the AC input terminals 6 for the respective phases, primary windings may foe provided to the leg circuits 100u, 100v, 100w and the leg circuits 100u, 100v, 100w may foe electrically connected to the transformer 3 via secondary windings magnetically coupled with the primary windings. In this case, the reactors 12P, 12N may be used as the primary winding for each phase.

That is, the upper arras Pu, Pv, Pw for the respective phases and the lower arms Nu, Nv, Nw for the respective phases are connected to each other by connection portions such as the AC input terminals 6 or the primary windings, and are electrically connected to the AC grid 2 via the connection portions.

The power conversion device 1 further includes DC voltage detectors 7P, 7N, an arm current detector 8 provided to each of the arms Pu, Nu, Pv, Nv, Pw, Nw, an AC voltage detector 9A, and an AC current detector 9B, as detectors for measuring electric quantities (current, voltage, etc.) used for control. Signals from these detectors are inputted to the control device 20 via signal lines.

The signal lines are formed by optical fibers, for example. In FIG. 1, for simplification, some of the signal lines for signals to be inputted from the detectors to the control device 20 are collectively shown. Similarly, some of signal lines for signals to be inputted/outputted between the control device 20 and the converter cells 11 are collectively shown. The signal lines between the converter cells 11 and the control, device 20 may be separately provided as the ones for transmission and the ones for reception.

Hereinafter, each detector will be specifically described.

The DC voltage detector 7P detects DC voltage VdcP of the positive DC terminal 5P. The DC voltage detector 7N detects DC voltage VdcN of the negative DC terminal 5N. A difference between the DC voltage VdcP and the DC voltage VdcN is defined as DC voltage Vdc.

The arm current detectors 8 provided to the arms Pu, Nu, Pv, Nv, Pw, Nw respectively detect am currents IPu, INu, IPv, INv, IPw, INw flowing through the arms Pu, Nu, Pv, Nv, Pw, Nw. In the following description, the arm currents IPu, IPv, IPw are collectively referred to as upper am currents IAP, the arm currents INu, INv, INw are collectively referred to as lower arm currents IAN, and the upper arm current IAP and the lower arm current IAN are collectively referred to as arm currents IA.

The AC voltage detector 9A detects AC voltage Vacu for U phase, AC voltage Vacv for V phase, and AC voltage Vacw for w phase of the AC grid 2. In the following description, Vacu, Vacv, and Vacw are collectively referred to as Vac.

The AC current detector 9B detects AC current Iacu for U phase, AC current Iacv for V phase, and AC current Iacw for W phase of the AC grid. In the following description, Iacu, Iacv, and Iacw are collectively referred to as Iac.

Figure 2:
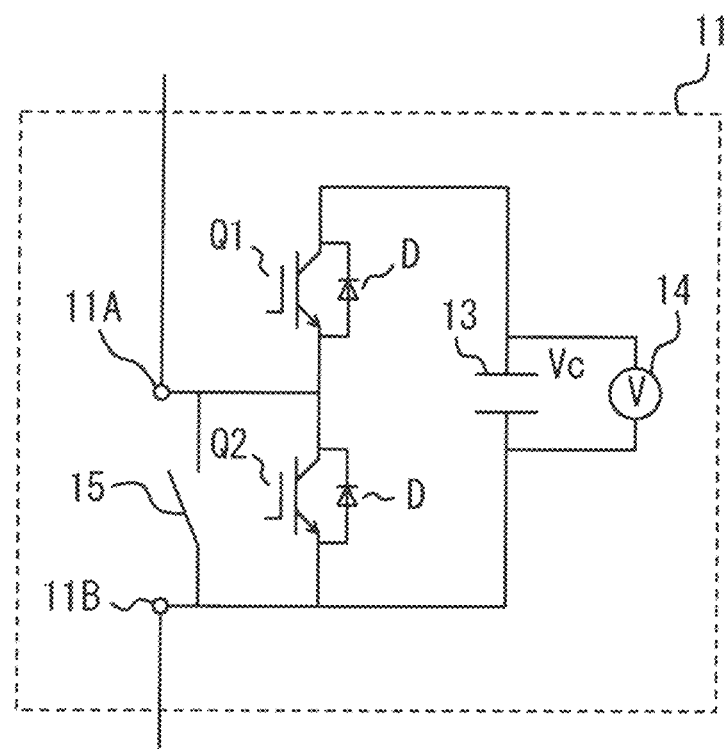
FIG. 2 shows a configuration example of a converter cell according to embodiment 1.

FIG. 2 and FIG. 3 show configuration examples of each converter cell 11 in the power converter 10.

The converter cell 11 shown in FIG. 2 has a circuit configuration called a half-bridge configuration.

This converter cell 11 includes a series unit formed by connecting, in series, two switching elements Q1, Q2 to which diodes D are connected in antiparallel, a DC capacitor 13, a voltage detector 14, and a bypass switch 15. The series unit of the switching elements Q1, Q2 and the DC capacitor 13 are connected in parallel.

In this case, both terminals of the switching element Q2 serve as input/output, terminals 11A, 11B of the converter cell 11. Through switching operations of the switching elements Q1, Q2, voltage Vc across the DC capacitor 13 or zero voltage is outputted. For example, when the switching element Q1 is ON and the switching element Q2 is OFF, the voltage Vc across the DC capacitor 13 is outputted. When the switching element Q1 is OFF and the switching element Q2 is ON, zero voltage is outputted.

The voltage detector 14 detects the voltage Vc across the DC capacitor 13. The bypass switch 15 is connected between the input/output terminals 11A, 11B. For example, by turning on the bypass switch 15 when the AC grid 2 is abnormal, the converter cell 11 is short-circuited, whereby the switching elements Q1, Q2 in the converter cell 11 are protected from overcurrent.

The converter cell 11 shown in FIG. 3 has a circuit configuration called a full-bridge configuration. This converter cell 11 includes a first series unit formed by connecting, in series, two switching elements Q3, Q4 to which diodes D are connected in antiparallel, a second series unit similarly formed by connecting, in series, two switching elements Q5, Q6 to which diodes D are connected in antiparallel, a DC capacitor 13, a voltage detector 14, and a bypass switch 15. The first series unit of the switching elements Q3, Q4, the second series unit of the switching elements Q5, Q6, and the DC capacitor 13 are connected in parallel.

In this case, the middle point in the first series unit of the switching elements Q3, Q4 and the middle point in the second series unit of the switching elements Q5, Q6 serve as input/output terminals 11A, 11B of the converter cell 11. Through switching operations of the switching elements Q3 to Q6, positive/negative voltage Vc across the DC capacitor 13 or zero voltage is outputted.

Similarly to the converter cell 11 shown in FIG. 2, the voltage detector 14 detects the voltage Vc across the DC capacitor 13. The bypass switch 15 is connected between the input/output terminals 11A, 11B.

As the switching elements Q1 to Q6 in the converter cell 11 shown in FIG. 2 and FIG. 3, for example, self-turn-off semiconductor switching elements such as an insulated gate bipolar transistor (IGBT), a gate commutated turn-off (GCT), or a thyristor are used. As the DC capacitor 13, a film capacitor is mainly used.

In the following description, the converter cell 11 having the half-bridge configuration shown in FIG. 2 is used.

The converter cell 11 may have a configuration other than the above-described ones, and for example, a circuit configuration called a clamped double cell may be used. Also, the switching elements Q1 to Q6 and the DC capacitor 13 are not limited to the above-described ones.

Next, the configuration of the control device 20 will be described.

As described above, the control device 20 receives the DC voltages VdcP, VdcN, the arm currents IA of the arms Pu, Nu, Pv, Nv, Pw, Nw, the AC voltage Vac for each phase, the AC current Iac for each phase, and the capacitor voltage Vc of each converter cell 11, which are detected values. Then, on the basis of the above received information, the control device 20 generates and outputs gate signals gs1, gs2 for driving the switching elements Q1, Q2 of each converter cell 11.

In the control device 20, from the above received information, the DC voltage Vdc and DC current Iac are calculated, and further, circulation currents Iccu, Iccv, Iccw for the respective phases are calculated. In the following description, Iccu, Iccv, and Iccw are collectively referred to as Icc.

The circulation current Icc for each phase is current circulating in the power converter 10 without flowing to the AC side and the DC side, and is represented as follows.

$$ICC = (IAP + IAN)/2 - Idc/3$$

FIG. 4 is a block diagram showing a main control unit 20A of the control device 20, and FIG. 5 is a block diagram showing an arm control unit 20B of the control device 20.

The control device 20 includes the main control unit 20A, and the arm control units 20B provided for the respective arms Pu, Nu, Pv, Nv, Pw, Nw. In FIG. 5, the arm control unit 20B for the arm Nu is shown.

As shown in FIG. 4, the main control unit 20A includes a DC control unit 21, a circulation current control unit 22, an AC control unit 23, an arm voltage command generation unit 24, a zero-phase-sequence voltage command generation unit 25, and an arm modulation command generation unit 26. Further, the main control unit 20A includes a capacitor voltage summing unit 27 and a phase locked loop (PLL) unit 28.

The DC control unit 21 receives the DC voltage Vdc and the DC current Idc, and on the basis of these, generates a DC voltage command Vdc*. The generated DC voltage command Vdc* is inputted to the arm voltage command generation unit 24.

The circulation current control unit 22 receives the circulation currents Icc for the respective phases, and on the basis of the circulation currents Icc, generates circulation voltage commands Vccu*, Vccv*, Vccw* for the respective phases. In the following description, Vccu*, Vccv*, and Vccw* are collectively referred to as Vcc*. The generated circulation voltage commands Vcc* for the respective phases are inputted to the arm voltage command generation unit 24.

The AC control unit 23 receives the AC voltages Vac for the respective phases and the AC currents Iac for the respective phases, and on the basis of these, generates AC voltage commands Vacu*, Vacv*, Vacw* for the respective phases. In the following description, Vacu*, Vacv*, and Vacw* are collectively referred to as Vac*. The generated AC voltage commands Vac* for the respective phases are inputted to the arm voltage command generation unit 24.

The arm voltage command generation unit 24 receives the DC voltage command Vdc*, the AC voltage commands Vac* for the respective phases, and the circulation voltage commands Vcc* for the respective phases, and further receives a zero-phase-sequence voltage command Vo* generated by the zero-phase-sequence voltage command generation unit 25. Then, the arm voltage command generation unit 24 generates arm voltage commands VAPu*, VANu*, VAPv*, VANv*, VAPw*, VANw* (referred to as arm voltage commands VA* when mentioning them collectively) as output voltage commands for the respective arms Pu, Nu, Pv, Nv, Pw, Nw.

First, a base command based on the DC voltage command Vdc*, the AC voltage command Vac* for each phase, and the circulation voltage command Vcc* for each phase is generated, and the zero phase-sequence voltage command Vo* its superimposed on the base command, whereby the arm voltage command VA* is generated.

For example, the arm voltage commands VAPu*, VANu* for U phase are represented by the following Expressions (1) and (2). The same applies to V phase and W phase.

$$VAPu^* = Vdc^* - Vacu^* + Vccu^* - Vo^* \quad (1)$$

$$VANu^* = Vdc^* + Vacu^* + Vccu^* + Vo^* \quad (2)$$

The capacitor voltage summing unit 27 obtains the capacitor voltages Vc of the respective converter cells 11 and calculates capacitor voltage sums VcAPu, VcANu, VcAPv, VcANv, VcAPw, VcANw (referred to as capacitor voltage sums VcA when mentioning them collectively) for the respective arms Pu, Nu, Pv, Nv, Pw, Nw. The arm control unit 20B for each arm Pu, Nu, Pv, Nv, Pw, Nw collects N capacitor voltages Vc of the converter cells 11.

The PLL unit 28 extracts a phase $\theta s$ from the AC voltage Vac for each phase. For example, the AC voltage Vacu for U phase is represented as Vacu=Vp·sin $\theta s$, using an amplitude Vp.

The zero-phase-sequence voltage command generation unit 25 receives the AC voltage commands Vac* for the respective phases, the respective arm voltage commands VA*, the capacitor voltage sums VcA for the respective arms, and the phase $\theta s$, and generates the zero-phase-sequence voltage command Vo*. The details of the zero-phase-sequence voltage command generation unit 25 will be described later.

The arm modulation command generation unit 26 receives the respective arm voltage commands VA* and the capacitor voltage sums VcA for the respective arms Pu, Nu, Pv, Nv, Pw, Nw. and generates arm modulation commands KAPu*, KANu*, KAPv*, KANv*, KAPw*, KANw* (referred to as arm modulation commands KA* when mentioning them collectively) for the respective arms Pu, Nu, Pv, Nv, Pw, Nw.

As described above, the control device 20 includes similar arm control units 20B for the respective arms Pu, Nu, Pv, Nv, Pw, Nw. Hereinafter, the arm control unit 20B, for the arm Nu will be described.

As shown in FIG. 5, the arm control unit 20B includes, for each converter cell 11 in the arm Nu, a cell control unit 29 for controlling the converter cell 11 individually. The arm control unit 20B receives the arm modulation command KANu* from the arm modulation command generation unit 26, the capacitor voltage sum VcANu from the capacitor voltage summing unit 27, and the detected arm current INu, as information about the arm Nu. The above received information is also inputted to each of the cell control units 29 for controlling the respective converter cells 11.

Each cell control unit 29 operates as follows.

In the converter cell 11 that is a control target of the cell control unit 29, the capacitor voltage Vc is detected by the voltage detector 14, and the capacitor voltage Vc is inputted to the cell control unit 29. In addition, the detected capacitor voltage Vc is also outputted from the cell control unit 29 to the capacitor voltage summing unit 27 of the main control unit 20A.

The cell control unit 29 controls the converter cell 11 so that the capacitor voltage Vc of the converter cell 11 that is the control target approaches an average value (VCANu/N) of the capacitor voltages in the arm Nu.

More specifically, the cell control unit 29 calculates a control quantity from the arm current INu and a deviation between the average value (VcANu/N) of the capacitor voltages and tires corresponding capacitor voltage Vc, and superimposes the control quantity on the arm modulation command KANu*, to correct the arm modulation command KANu*. Then, on the basis of the corrected arm modulation command KANu*, the cell control unit 29 generates and outputs gate signals gs1, gs2 for driving the switching elements Q1, Q2 of the corresponding converter cell 11.

In the above description of the control device 20, for simplification, the case where control for balancing the capacitor voltage sums VcA for the respective arms Pu, Mu, Pv, Nv, Pw, Nw is omitted has been shown. However, control for balancing the DC voltages between phases or between arms may be added.

FIG. 6 is a block diagram showing the zero-phase-sequence voltage command generation unit 25.

As shown in FIG. 6, the zero-phase-sequence voltage command generation unit 25 receives the AC voltage commands Vac* for the respective phases, the respective arm voltage commands VA*, the capacitor voltage sums VcA for the respective arms, and the phase $\theta s$, and generates the zero-phase-sequence voltage command Vo*. In this case, the zero-phase-sequence voltage command Vo* having a frequency component that is three times the fundamental frequency of AC voltage is generated with the phase thereof adjusted. Then, as described above, the zero-phase-sequence voltage command Vo* is superimposed on the base command, whereby the arm voltage command VA* is generated.

The zero-phase-sequence voltage command Vo* has a common value among U phase, V phase, and W phase, and theoretically, does not influence outputted AC voltage between phases. In addition, since the zero-phase-sequence voltage command Vo* has a frequency component that is three times the fundamental frequency of the AC voltage, when the AC voltage Vac is balanced and the numbers of normal converter cells 11 (the numbers of operating converter cells 11) included in the respective arms Pu, Nu, Pv, Nv, Pw, Nw are equal, instantaneous power for each phase is balanced.

The AC voltage command Vac* inputted to the zero-phase-sequence voltage command generation unit 25 is inputted to a zero-phase-sequence voltage generation unit 30 and a reference phase generation unit 31 in the zero-phase-sequence voltage command generation unit 25.

The reference phase generation unit 31 detects phase shift $\theta v$ of AC voltage due to voltage drop by the transformer 3 and the reactor 12P (or 12N) (hereinafter, may be simply referred to as phase $\theta v$), and the phase shift $\theta v$ is inputted to a phase adjustment unit 32. On the basis of the phase $\theta v$ outputted from the reference phase generation unit 31, the reference phase of the AC voltage command Vac* becomes ($\theta s + \theta v$).

The phase adjustment unit 32 further receives the respective arm voltage commands VA*, the capacitor voltage sums VcA for the respective arms, and the phase θs, and determines an adjustment phase θo fox adjusting the phase of the zero-phase-sequence voltage command Vo* (hereinafter, may be simply referred to as phase θo).

The zero-phase-sequence voltage generation unit 30 generates the zero-phase-sequence voltage command Vo* on the basis of the AC voltage command Vac* and the phases θs, θv, θo.

When the circulation current Icc is 0, the arm voltage command VANu* for the U-phase lower arm Nu is represented by the following Expression (3), on the basis of the above Expression (2).

$$VANu^* = Vdc^* + Vacu^* + Vo^* \quad (3)$$

Here, Vdc* and Vacu* are represented as Vdc*=Vdc/2 and Vacu*=Vp·sin(θs+θv), and the zero-phase-sequence voltage command Vo* is represented by the following Expression (4), using a constant a.

$$Vo^* = a \cdot Vp \cdot \sin 3(\theta s + \theta v + \theta o) \quad (4)$$

Then, the above Expression (3) can be deformed into the following Expression (5).

$$VANu^* = (Vdc/2) + Vp \cdot \sin(\theta s + \theta v) + a \cdot Vp \cdot \sin 3(\theta s + \theta v + \theta o) \quad (5)$$

In a general 2-level three-phase power conversion device not having a MMC configuration, a common DC capacitor is connected for three phases collectively. Therefore, power pulsations occurring in the respective phases are canceled out and the voltage of the DC capacitor is constant while hardly pulsating. In such a case, phase adjustment for the zero-phase-sequence voltage command to be superimposed is not needed, that is, with the adjustment phase θo=0, the peak of the AC output voltage can be reduced. Here, power flows in/out to/from the DC capacitor due to switching, but is negligible because the switching frequency is a high frequency.

Also in a power conversion device having a MMC configuration, the same applies if voltage of the DC capacitor is almost constant without pulsating. This will be shown as a first comparative example below.

FIG. 7 is a waveform diagram showing the relationship between a capacitor voltage sum for an arm and an arm voltage command in the first comparative example. The first comparative example is an example in which voltage of the DC capacitor is almost constant without pulsating under the same configuration as that of the power conversion device 1 according to embodiment 1.

As shown in FIG. 7, a capacitor voltage sum VcAα for an arm is constant. For controlling the output voltage of the arm, a zero-phase-sequence voltage command is superimposed on a base command VAα*, whereby an arm voltage command VAβ* is generated. In this case, phase adjustment for the zero-phase-sequence voltage command is not needed, and the zero-phase-sequence voltage command Vo* and the arm voltage command VANu* (VAβ*) obtained when θo is 0 in the above Expressions (4) and (5) are used.

In the first comparative example, it is found that the peak of the arm voltage command VAβ* on which the zero-phase-sequence voltage command with no phase adjustment has been superimposed is reduced. In this case, by setting the constant a to 1/6, a necessary output voltage range can be reduced by about 13%.

The power conversion device 1 having the MMC configuration according to embodiment 1 is used in a HVDC system or a BTB system, and in actuality, power pulsation occurring in each arm directly flows in/out to/from the DC capacitor 13 of each converter cell 11. For example, the arm current INu of the arm Nu which is the U-phase lower arm is represented by the following Expression (6). Here, Ip is an amplitude and φ is a power factor.

$$INu = -Idc/3 + Ip \cdot \sin(\theta s + \varphi) \quad (6)$$

Instantaneous power pNu flowing in/out to/from the arm Nu is calculated as a product of the arm voltage command VANu* shown by the above Expression (5) and the arm current INu shown by the above Expression (6), and is represented by the following Expression (7). Here, the influence on the instantaneous power pNu due to superimposition of the zero-phase-sequence voltage command Vo* in Expression (5) is small and therefore is regarded as 0, for simplification.

$$pNu = (Vdc \cdot Ip/2) \cdot \sin(\theta s + \varphi) - (Vp \cdot Idc/3) \cdot \sin(\theta s + \theta v) - (Vp \cdot Ip/2) \cdot \cos(2\theta s + \theta v + \varphi) \quad (7)$$

From the above Expression (7), it is found that power pulsation having a frequency that is equal to or two times the fundamental frequency of the AC grid 2 flows in/out to/from the arm Nu. Power pulsation ΔWNu at t=0 in the DC capacitor 13 in the arm Nu is represented by the following Expression (8). Here, θs=ωt is satisfied.

$$\Delta WNu = -(Vdc \cdot Ip/2\omega) \cdot \cos(\theta s + \varphi) + (Vp \cdot Idc/3\omega) \cdot \cos(\theta s + \theta v) - (Vp \cdot Ip/4\omega) \cdot \sin(2\theta s + \theta v + \varphi) \quad (8)$$

With the power pulsation ΔWNu, the capacitor voltage sum VcANu for the arm Nu pulsates, and voltage that can be outputted by the arm Nu also varies with time. The pulsation of the capacitor voltage sum VcA increases as the capacitance of the DC capacitor 13 becomes smaller.

A case where, while the capacitor voltage sum VcA varies with time, the arm voltage command VAβ* on which the zero-phase-sequence voltage command with no phase adjustment has been superimposed is used as in the first comparative example, will be shown as a second comparative example below.

FIG. 8 is a waveform diagram showing the relationship between a capacitor voltage sum for an arm and an arm voltage command in the second comparative example. The second comparative example is an example in which, under the same configuration as that of the power conversion device 1 according to embodiment 1, voltage of the DC capacitor 13 pulsates and the same zero-phase-sequence voltage command as used in the above first comparative example, i.e., the zero-phase-sequence voltage command with no phase adjustment is used. The base command VAα* and the arm voltage command VAβ* are the same as in the first comparative example shown in FIG. 7, while the capacitor voltage sum VcA for the arm is pulsating.

In the second comparative example, the arm voltage command VAβ* does not fall within an output voltage range between the value of the capacitor voltage sum VcA and 0, and as a result, there is a region where voltage cannot be outputted.

In addition, each converter cell 11 is individually controlled and the output voltage thereof might increase/decrease more or less. Further, pulsation due to switching is superimposed on the capacitor voltage Vc of each converter cell 11, so that the range of voltage that can be outputted might change more or less.

From the above, it is desirable that the arm voltage command falls within the output voltage range with a margin provided.

In the present embodiment, by performing phase adjustment of the zero-phase-sequence voltage command Vo*, the arm voltage command VA* is caused to fall within the output voltage range between the value of the capacitor voltage sum VcA and 0 with a margin provided. In this case, the control device 20 changes the adjustment phase θo for the zero-phase-sequence voltage command Vo* so that a margin of the arm voltage command VA* with respect to the output voltage range increases.

Phase adjustment of the zero-phase-sequence voltage command Vo* will be described in detail below.

As the margin of the arm voltage command VA* with respect to the output voltage range (0 to VcA) of the arm, there are an upper margin σU to an upper limit value VcA and a lower margin σL to a lower limit value 0. The upper margin σU is a control margin in the present disclosure. Both margins are instantaneous values. The upper margin σU is a value obtained by subtracting the arm voltage command VA* from the capacitor voltage sum VcA and the lower margin σL is equal to the arm voltage command VA*.

In order to increase the margin of the arm voltage command VA* with respect to the output voltage range (0 to VcA) of the arm, both of a minimum value σUmin of the upper margin σU and a minimum value σLmin of the lower margin σL need to be made as great as possible in one cycle of the AC voltage. Therefore, the adjustment phase θo for the zero-phase-sequence voltage command Vo* is changed so that the smaller one of the two minimum values σUmin, σLmin in one cycle of the AC voltage increases.

FIG. 9 is a waveform diagram at various parts, for illustrating operation of the power conversion device. In FIG. 9, the capacitor voltage sum VcA, the arm voltage command VA*, the upper margin σU, the lower margin σL, and the zero-phase-sequence voltage command Vo* are shown. Here, a case where the adjustment phase θo for the zero-phase-sequence voltage command Vo* is increased is shown, and a zero-phase-sequence voltage command Vo*a, an arm voltage command VA*a, an upper margin σUa, and a lower margin σLa are waveforms before phase adjustment.

Here, waveforms for the arm Nu are shown. The capacitor voltage sum VcA, the arm voltage command VA*, the upper margin σU, and the lower margin σL may re read as being replaced with a capacitor voltage sum VcANu, an arm voltage command VANu*, an upper margin σUNu, and a lower margin σLNu.

In a case where positive power is transmitted from the AC grid 2 to the DC circuit 4, the capacitor voltage sum VcANu for the arm Nu pulsates as follows, in accordance with the above Expression (8). That is, on the capacitor voltage sum VcANu, negative-direction pulsation is superimposed in a range of 0≤θs≤π/2, and positive-direction pulsation is superimposed in a range of π/2≤θs≤π.

If the adjustment phase θo for the zero-phase-sequence voltage command Vo* is 0, the arm voltage command VANu* has local maximum values at θs=π/3 and 2π/3. Therefore, around θs=π/3, the capacitor voltage sum VCANu is small and the range of voltage that can be outputted is small, so that the upper margin σUNu also becomes small. Around θs=2π/3, the capacitor voltage sum VcANu is great and the range of voltage that can be outputted is great, so that the upper margin σUNu also becomes great.

It is known that, in the arm voltage command VANu* shown by the above Expression (5), the necessary output voltage range can be effectively reduced in a case of a=1/6, and the arm voltage command VANu* can be represented by the following Expression (9).

$$VANu^* = (Vdc/2) + Vp \cdot \sin(\theta s + \theta v) + (1/6) \cdot Vp \cdot \sin 3(\theta s + \theta v + \theta o) \quad (9)$$

On the basis of the above Expression (9), the upper margin σUNu and the lower margin σLNu for the arm Nu are calculated so as to be represented by the following Expression (10) and Expression (11).

$$\sigma UNu = VcANu - ((Vdc/2) + Vp \cdot \sin(\theta s + \theta v) + (1/6) \cdot Vp \cdot \sin 3(\theta s + \theta v + \theta o)) \quad (10)$$

$$\sigma LNu = (Vdc/2) + Vp \cdot \sin(\theta s + \theta v) + (1/6) \cdot Vp \cdot \sin 3(\theta s + \theta v + \theta o) \quad (11)$$

The adjustment phase θo (=ωt) for the zero-phase-sequence voltage command Vo* changes, and if the above Expression (10) and Expression (11) are differentiated with respect to the adjustment phase θo, the following Expression (12) and Expression (13) are obtained. Here, VcANu in Expression (10) is hardly influenced by the zero-phase-sequence voltage command Vo* and therefore is neglected.

$$\sigma UNu/dt = -(1/2) \cdot Vp \cdot \cos 3(\theta s + \theta v + \theta o) \quad (12)$$

$$\sigma LNu/dt = (1/2) \cdot Vp \cdot \cos 3(\theta s + \theta v + \theta o) \quad (13)$$

From Expression (12) and Expression (13), as shown in FIG. 9, when the adjustment phase θo is increased, the upper margin σUNu around θs+θv=π/3 (region X1) increases, and the upper margin σUNu around θs+θv=2π/3 (region X2) decreases. In addition, the lower margin σLNu around θs+θv=4π/3 (region X3) increases, and the lower margin σLNu around θs+θv=5π/3 (region X4) decreases.

Conversely, when the adjustment phase θo is decreased, the upper margin σUNu around θs+θv=π/3 (region X1) decreases, and the upper margin σUNu around θs+V=2π/3 (region X2) increases. In addition, the lower margin σLNu around θs+θv=4π/3 (region X3) decreases, and the lower margin σLNu around θs+θv=5π/3 (region X4) increases.

As described above, through phase adjustment of the zero-phase-sequence voltage command Vo*, the minimum value σUmin of the upper margin σU obtained in the region X1 or the region X2 based on the reference phase (θs+θv) and the minimum value σLmin of the lower margin σL obtained in the region X3 or the region X4 are changed. At this time, by changing the adjustment phase θo so that the smaller one of the two minimum values σUmin, σLmin increases, the margin of the arm voltage command VA* with respect to the output voltage range is increased.

In the case shown in FIG. 9, before the phase adjustment, the minimum value σUmin of the upper margin σUa obtained in the region X1 is smaller than the minimum value σLmin of the lower margin σLa obtained in the region X4, and therefore the adjustment phase θo is increased to increase the minimum value σUmin of the upper margin σUa.

In the region X1 and the region X3, the margin (upper margin σU or lower margin σL) increases with increase in the adjustment phase θo, and in the regions X2 and X4, the margin (upper margin σU or lower margin σL) decreases with increase in the adjustment phase θo. Therefore, a case where the margin of the arm voltage command VA* with respect to the output voltage range becomes greatest is when the smaller one of the minimum value of the upper margin σU in the region X1 and the minimum value of the lower margin σL in the region X3 coincides with the smaller one of the minimum value of the upper margin σU in the region X2 and the minimum value of the lower margin σL in the region X4.

FIG. 10 to FIG. 12 are waveform diagrams at various parts, for illustrating operation of the power conversion device, and show cases where the margin of the arm voltage command VA* with respect to the output voltage range becomes greatest. In FIG. 10 to FIG. 12, as in FIG. 9, the capacitor voltage sum VcA, the arm voltage command VA*, the upper margin σU, the lower margin σL, and the zero-phase-sequence voltage command Vo* are shown. FIG. 10 and FIG. 11 show cases where the adjustment phase θo for the zero-phase-sequence voltage command Vo* is increased, and the zero-phase-sequence voltage command Vo*a, the arm voltage command VA*a, the upper margin σUa, and the lower margin σLa are waveforms before phase adjustment. FIG. 12 shows a case where the adjustment phase θo is kept without being changed, and the zero-phase-sequence voltage command Vo*a before phase adjustment overlaps the zero-phase-sequence voltage command Vo*.

Also in FIG. 10 to FIG. 12, waveforms for the arm Nu are shown, and the capacitor voltage sum VcA, the arm voltage command VA*, the upper margin σU, and the lower margin σL may be read as being replaced with the capacitor voltage sum VcANu, the arm voltage command VANu*, the upper margin σUNu, and the lower margin σLNu. Although not shown, as in FIG. 9, regions of the reference phase (θs+θv) around π/3, around 2π/3, around 4π/3, and around 5π/3 are defined as a region X1, a region X2, a region X3, and a region X4, respectively.

In the case shown in FIG. 10, the adjustment phase θo is increased so that the minimum value σUmin of the upper margin σU obtained in the region X1 and the minimum value σLmin of the lower margin σL obtained in the region X4 become equal to each other. In this case, the minimum value of the upper margin σU in the region X1 is smaller than the minimum value of the lower margin σL in the region X3, and the minimum value of the lower margin σL in the region X4 is smaller than the minimum value of the upper margin σU in the region X2. Then, the minimum value (σUmin) of the upper margin σU in the region X1 and the minimum value (σLmin) of the lower margin σL in the region X4 are compared with each other, and in this case, the adjustment phase θo is increased. Thus, σUmin is increased and σLmin is decreased so as to make σUmin and σLmin equal to each other.

In the case shown in FIG. 11, the adjustment phase θo is increased so that the minimum value of the upper margin σU in the region X1 and the minimum value of the upper margin σU in the region X2 become an equal minimum value σUmin. In this case, the minimum value of the upper margin σU in the region X1 is smaller than the minimum value of the lower margin σL in the region X3, and the minimum value of the upper margin σU in the region X2 is smaller than the minimum value (σLmin) of the lower margin σL in the region X4. Then, the minimum value of the upper margin σU in the region X1 and the minimum value of the upper margin σU in the region X2 are compared with each other, and in this case, the adjustment phase θo is increased. Thus, the minimum value of the upper margin σU in the region X1 is increased and the minimum value of the upper margin σU in the region X2 is decreased so that both values become an equal minimum value σUmin.

In the case shown in FIG. 12, the minimum value of the lower margin σL in the region X3 and the minimum value of the Lower margin σL in the region X4 become an equal minimum value σLmin. In this case, the minimum value of the lower margin σL in the region X3 is smaller than the minimum value (σUmin) of the upper margin σU in the region X1, and the minimum value of the lower margin σL in the region X4 is smaller than the minimum value of the upper margin σU in the region X2. Then, the minimum value of the lower margin σL in the region X3 and the minimum value of the lower margin σL in the region X4 are compared with each other, and in this case, both values are an equal minimum value σLmin. Therefore, the adjustment phase θo is not changed.

In the control device 20, in accordance with the capacitance of the DC capacitor 13, the AC voltage Vac, the DC voltage Vdc, or the like in the power converter 10, a circuit constant, and the operation state of the power converter 10, the above-described method is applied, thereby changing the adjustment phase θo so as to maximize the margin of the arm voltage command VA* with respect to the output voltage range.

Hereinafter, a specific adjustment method for the adjustment phase θo will be described with reference to FIG. 13.

FIG. 13 is a waveform diagram showing the arm voltage command (lower margin σL) and the control margin (upper margin σU) for the arm Nu.

As shown in FIG. 13, for the arm Nu, in one cycle of the AC voltage, the upper margin σU has one or two first local minimum values σUα, σUβ which can become the minimum value thereof, in a first half cycle range of $0 \leq \theta s+\theta v<\pi$. In addition, the lower margin σL has one or two second local minimum values σLα, σLβ which can become the minimum value thereof, in a second half cycle range of $\pi \leq \theta s+\theta b<2\pi$. Here, a case where there are two first local minimum values σUα, σUβ in the first half cycle range and there are two second local minimum values σLα, σLβ in the second half cycle range, is shown.

Here, the first local minimum value σUα is a value (magnitude: U1, around θs+θv=π/3 (region X1) in the first half ($0 \leq \theta s+\theta v<\pi/2$) of the first half cycle, and the first local minimum value σUβ is a value (magnitude: U2) around θs+θv=2π/3 (region X2) in the second half ($\pi/2 \leq \theta s+\theta v<\pi$) of the first half cycle. In addition, the second local minimum value σLα is a value (magnitude: L1) around θs+θv=4π/3 (region X3) in the first half ($\pi \leq \theta s+\theta v<3\pi/2$) of the second half cycle, and the second local minimum value σLβ is a value (magnitude: L2) around θs+θv=5π/3 (region X4) in the second half ($3\pi/2 \leq \theta s+\theta v<2\pi$) of the second half cycle.

In the control device 20, first, the phase adjustment unit 32 of the zero-phase-sequence voltage command generation unit 25 monitors the upper margin σU and the lower margin σL, and detects the first local minimum values σUα, σUβ and the second local minimum values σLα, σLβ in one cycle of the AC voltage. As an example of the detection method, detection is performed when the upper margin σU or the lower margin σL h as become greater than the value in the previous cycle through consecutive three sampling cycles.

Next, from the detected first local minimum values σUα, σUβ and second local minimum values σLα, σLβ, a third local minimum value which is smallest in a range of the first half of the first half cycle and the first half of the second half cycle, is extracted. That is, the first local minimum value σUα and the second local minimum value σLα are compared with each other, and the smaller one is extracted as the third local minimum value.

Similarly, a fourth local minimum value which is smallest in a range of the second half of the first half cycle and the second half of the second half cycle, is extracted. That is, the first local minimum value σUβ and the second local minimum value σLβ are compared with each other, and the smaller one is extracted as the fourth local minimum value.

In a case where one of the two local minimum values (first local minimum value σUα and second local minimum value σLα) to be used for extracting the third local minimum value is absent, the detected other local minimum value is used as the third local minimum value. Similarly, in a case where one of the two local minimum values (first local minimum value σUβ and second local minimum value σLβ) to be used for extracting the fourth local minimum value is absent, the detected other local minimum value is used as the fourth local minimum value.

Then, the third local minimum value is subtracted from the fourth local minimum value, to calculate a deviation. When the deviation is positive, the adjustment phase θo for the zero-phase-sequence voltage command Vo* is increased, and when the deviation is negative, the adjustment phase θo is decreased.

Here, in a case of U1<L2<U2<L1, the third local minimum value is U1 (first local minimum value σUα) and the fourth local minimum value is L2 (second local minimum value (σLβ) and the deviation is positive. Thus, the adjustment phase θo is increased.

Regarding increase/decrease of the adjustment phase θo, the adjustment phase θo may be changed on a certain value basis, or integral control or the like may be used. In addition, with a set value provided in advance, if the deviation obtained by subtracting the third local minimum value from the fourth local minimum value is smaller than the set value, the adjustment phase θo may be fixed without being changed. This can prevent the adjustment phase Oro from being frequently changed every time the arm voltage command VA* or the capacitor voltage sum VcA for the arm is slightly changed due to disturbance or the like. Therefore, a phenomenon in which new disturbance occurs due to frequent change of the adjustment phase θo so that the adjustment phase θo cannot converge, does not happen, and thus the adjustment phase θo can be reliably controlled.

In the present embodiment, as described above, by performing adjustment to increase/decrease the adjustment phase θo, phase adjustment of the zero-phase-sequence voltage command Vo* is performed. Thus, even if the capacitor voltage sum VcA pulsates, the margin of the arm voltage command VA* with respect to the output voltage range based on the capacitor voltage sum VcA can be increased, whereby utilization of DC voltage can be assuredly improved.

In the above phase adjustment, the case of adjusting the adjustment phase θo for the arm voltage command VA* for the U-phase lower arm Nu has been shown, and the zero-phase-sequence voltage command Vo* thus obtained is used in common for all the arms Pu, Nu, Pv, NV, Pw, NW. Under the assumption that the AC grid 2 is in a three-phase balanced state, calculation of the adjustment phase θo may be performed for at least one of the six arms Pu, Nu, Pv, Nv, Pw, Nw, whereby the margin of the arm voltage command VA* with respect to the output voltage range can be increased for all the arms and thus utilization of DC voltage can be assuredly improved.

Embodiment 2

In the above embodiment 1, the case where calculation of phase adjustment for the zero-phase-sequence voltage command Vo* is performed for one arm has been shown.

In embodiment 2, for all the six arms Pu, Nu, Pv, Nv, Pw, Nw included in the power converter 10, six values of each of the first local minimum values σUα, σUβ and the second local minimum values σLα, σLβ of the upper margin σU and the lower margin σL are detected per one cycle of the AC voltage. Then, among the six detected values of each local minimum value, the smallest first local minimum values σUαmin, σUβmin and second local minimum values σLαmin, σLβmin are extracted.

The subsequent method is the same as in the above embodiment 1. That is, among the first local minimum values σUαmin, σUβmin and the second local minimum values σLαmin, σLβmin, the first local minimum value σUαmin and the second local minimum value σLαmin are compared with each other, and the smaller one is extracted as the third local minimum value. Similarly, the first local minimum value σUβmin and the second local minimum value σLβmin are compared with each other, and the smaller one is extracted as the fourth local minimum value.

Then, the third local minimum value is subtracted from the fourth local minimum value, to calculate a deviation. When the deviation is positive, the adjustment phase θo for the zero-phase-sequence voltage command Vo* is increased, and when the deviation is negative, the adjustment phase θo is decreased.

As described above, by performing adjustment to increase/decrease the adjustment phase θo, phase adjustment of the zero-phase-sequence voltage command Vo* is performed. Thus, even if the capacitor voltage sum VcA pulsates, the margin of the arm voltage command VA* with respect to the output voltage range based on the capacitor voltage sum VcA can be increased, whereby utilization of DC voltage can be assuredly improved.

The AC grid 1 is basically in a three-phase balanced state, but in actuality, there is a case of not being in a three-phase balanced state. In addition, in a case where one of the converter cells 11 in any arm of the power converter 10 has failed, operation is performed by bypassing the failed converter cell 11 via the bypass switch 15. In this case, the number of the converter cells 11 that can perform output becomes smaller in the arm than in the other normal arms, so that the voltage that can be outputted decreases, and also, since the number of the DC capacitors 13 becomes small, pulsation of the capacitor voltage sum VcA also increases. Therefore, for the arm including the failed converter cell 11, the margin of the arm voltage command VA* with respect to the output voltage range tends to be smaller as compared to the other normal arms.

In the present embodiment, as described above, the upper margins σU and the lower margins σL for all the arms are monitored, and calculation of phase adjustment is performed on the basis of the first local minimum values σUα, σUβ and the second local minimum values σLα, σLβ for all the arms. Thus, even in a case where the three-phase balance of the AC grid 2 is lost or a case where there are variations in the main circuit constants for the arms or there are variations in the numbers of normal converter cells 11 in the arms of the power converter 10, the margins of the arm voltage commands VA* with respect to the output voltage range can be increased in the entire power conversion device 1. That is, while the margin for one arm is improved, a problem such as deterioration in the margins for the other arms does not occur, and for all the arms, the arm voltage commands VA* can fall within the output voltage range with margins provided, whereby utilization of DC voltage can be assuredly improved with high reliability.

Embodiment 3

In the above embodiments 1 and 2, for phase adjustment of the zero-phase-sequence voltage command Vo*, the upper margin σU and the lower margin σL for the arm are monitored and the first local minimum values σUα, σUβ and the second local minimum values σLα, σLβ are detected in one cycle of the AC voltage.

In the present embodiment, extrema of the upper margin σU and the lower margin σL are not detected and the minimum value within a divided section is used. Matters other than phase adjustment of the zero-phase-sequence voltage command Vo* are the same as in the above embodiment 1.

FIG. 14 is a waveform diagram showing respective detection sections and phase update of the zero-phase-sequence voltage command in the power conversion device. As shown in FIG. 14, one cycle of the AC grid 2 is divided into six PH sections which are detection sections at PH=0 to 5, and the adjustment phase θo is updated at a timing T of a set phase θs+θv+θo=π/2+2mπ (m is an integer), as a phase adjustment time point. In FIG. 14, θs+θv+θo (θo=θ1) before update of the adjustment phase θo and θs+θv+θo (θo=θ1+Δθo) after the update, are shown.

In the control device 20, the phase adjustment unit 32 of the zero-phase-sequence voltage command generation unit 25 monitors the upper margin σU and the lower margin σL for the set arm in each PH section (PH=0 to 5), to detect the upper margin minimum value and the lower margin minimum value, and calculates and updates the adjustment phase θo at the timing T.

Hereinafter, an adjustment method for the adjustment phase θo according to the present embodiment will be described in detail with reference to FIG. 15 to FIG. 18.

FIG. 15 is a waveform diagram showing the arm voltage command (lower margin σL) and the control margin (upper margin σU) for each arm in the power conversion device.

In FIG. 15, waveforms of the upper margin σU and the lower margin σL for each arm Pu, Nu, Pv, NV, Pw, Nw in a range of 0≤θs+θv+θo≤2π are shown. In FIG. 15, for simplification, θo is not changed at the update timing T (θs+θv+θo=π/2).

A timing θs+θv+θo=π/2 is a start point of the PH section at PH=0. For the arm Nu, a first instantaneous value σU1 and a second instantaneous value σU2 where the upper margin σU can become the minimum value are in the PH sections at PH=5 and PH=0, respectively, and a first instantaneous value σL1 and a second instantaneous value σL2 where the lower margin σL can become the minimum value are in the PH sections at PH=2 and PH=3, respectively. In the other PH sections at PH=1 and PH=4, the AC component of the arm voltage command VA* (lower margin σL) passes 0.

As described above, for each arm, the PH sections corresponding to the first instantaneous value σU1 and the second instantaneous value σU2 where the upper margin σU can become the minimum value, and the PH sections corresponding to the first instantaneous value σL1 and the second instantaneous value σL2 where the lower margin σL can become the minimum value, are present.

From the above Expression (12) and Expression (13), when the adjustment phase θo is increased, the first instantaneous value σU1 of the upper margin σU increases and the second instantaneous value σU2 decreases. In addition, the first instantaneous value σL1 of the lower margin σL increases and the second instantaneous value σL2 decreases.

Conversely, when the adjustment phase θo is decreased, the first instantaneous value σU1 of the upper margin σU decreases and the second instantaneous value σU2 increases. In addition, the first instantaneous value σL1 of the lower margin σL decreases and the second instantaneous value σL2 increases.

In each of the PH sections at PH=0 to 5, four instantaneous values, i.e., the first instantaneous value σU1 and the second instantaneous value σU2 of the upper margins σU and the first instantaneous value σL1 and the second instantaneous value σL2 of the lower margins σL axe each detected for different arms. With reference to FIG. 15, for example, in the PH section at PH=0, the second instantaneous value σL2 of the lower margin σL is detected for the arm Pu, the second instantaneous value σU2 of the upper margin σU is detected for the arm Nu, the first instantaneous value σU1 of the upper margin σU is detected for the arm Pw, and the first instantaneous value σL1 of the lower margin σL is detected for the arm Pu.

As described above, in each PH section, first to fourth arms which are arms for which the four instantaneous values, i.e., the first instantaneous value σU1 and the second instantaneous value σU2 of the upper margins σU and the first instantaneous value σL1 and the second instantaneous value σL2 of the lower margins σL are detected, are determined.

FIG. 16 shows detection arms set for each detection section in the power conversion device. In the control device 20, the phase adjustment unit 32 of the zero-phase-sequence voltage command generation unit 25 stores information in which the first to fourth arms corresponding to the above four instantaneous values σU1, σU2, σL1, σL2 are set in advance in each PH section, as a table as shown in FIG. 16, for example. Then, in accordance with the stored information, the instantaneous values σU1, σU2, σL1, σL2 for the set first to fourth arms are detected in each PH section.

FIG. 17 and FIG. 18 are flowcharts illustrating operation of the power conversion device. In this case, operation for phase adjustment of the zero-phase-sequence voltage command Vo*, i.e., calculation and update of the adjustment phase θo, by the phase adjustment unit 32 of the zero-phase-sequence voltage command generation unit 25 in the control device 20, will be described.

First, the phase adjustment unit 32 recognizes the PH section at PH=0, using the phase θs (=ωt) of the AC voltage Vac from the AC grid 2, phase shift θv between the AC voltage Vac and the AC component of the arm voltage command VA*, and the adjustment phase θo (step S00).

Next, by referring to the stored information in which the first to fourth arms are set, the instantaneous values (first instantaneous value σU1 and second instantaneous value σU2) of the upper margins σU for the first arm and the second arm and the instantaneous values (first instantaneous value σL1 and second instantaneous value σL2) of the lower margins σL for the third arm and the fourth arm are detected in the PH section at PH=0 (step S01).

Next, for θ*=θs+θv+θo, whether PH=0 and θ*≥5π/6 are satisfied is determined, and in a case of No, the process returns to step S01 (step S02).

In a case of Yes in step S02, minimum values σU1min, σU2min, σL1min, σL2min of the instantaneous values σU1, σU2, σL1, σL2 in the PH section (PH=0) detected in step S01 are stored as a first value, a second value, a third value, and a fourth value (step S03). Then, the PH section is set to the section at PH=1 (step S04).

Next, by referring to the stored information in which the first to fourth arms are set, the instantaneous values (first instantaneous value σU1 and second instantaneous value σU2) of the upper margins σU for the first arm and the second arm and the instantaneous values (first instantaneous value σL1 and second instantaneous value σL2) of the lower margins σL for the third arm and the fourth arm are detected in the PH section at PH=1 (step SO5).

Next, for $\theta^*=\theta s+v+\theta o$, whether PH=1 and $\theta^*\geq 7\pi/6$ are satisfied is determined, and in a case of No, the process returns to step S05 (step S06).

In a case of Yes in step S06, minimum values $\sigma$U1min, $\sigma$U2min, $\sigma$L1min, $\sigma$L2min of the instantaneous values $\sigma$U1, $\sigma$U2, $\sigma$L1, $\sigma$L2 in the PH section (PH=1) detected in step S05 are stored as a first value, a second value, a third value, and a fourth value (step S07). Then, the PH section is set to the section at PH=2 (step S08).

Next, the above four steps from step 04 to step 08 are repeated while PH is increased by 1 for each time and the range of $\theta^*$ is also increased by $\pi/3$ for each time, until the PH section is set to the section at PH=5 (step S20). Then, in the PH section at PH=5, similarly, the instantaneous values $\sigma$U1, $\sigma$U2, $\sigma$L1, $\sigma$L2 are detected (step S21).

Next, for $\theta^*=\theta s+\theta v+\theta o$, whether PH=5 and $\theta^*\geq \pi/2$ are satisfied is determined, and in a case of No, the process returns to step S21 (step S22).

In a case of Yes in step S22, minimum values $\sigma$U1min, $\sigma$U2min, $\sigma$L1min, $\sigma$L2min of the instantaneous values $\sigma$U1, $\sigma$U2, $\sigma$L1, $\sigma$L2 in the PH section (PH=5) detected in step S21 are detected and stored as a first value, a second value, a third value, and a fourth value (step S23). Then, the adjustment phase $\theta o$ is calculated and updated on the basis of the minimum values $\sigma$U1min, $\sigma$U2min, $\sigma$L1min, $\sigma$L2min stored in the respective PH sections (step S24), and the process returns to step S00 to set the PH section to the section at PH=0.

The calculation of the adjustment phase $\theta o$ in step S24 is performed as follows. Each minimum value of six data of each of $\sigma$U1min, $\sigma$U2min, $\sigma$L1min, $\sigma$L2min in all the PH sections at PH=0 to 5 is defined as a first minimum value $\sigma$U1$m$, a second minimum value $\sigma$U2$m$, a third minimum value $\sigma$L1$m$, and a fourth minimum value $\sigma$L2$m$, respectively. Then, the first minimum value $\sigma$U1$m$ and the third minimum value $\sigma$L1$m$ are compared with each other and the smaller one is extracted as $\sigma$UL1, and similarly, the second minimum value $\sigma$U2$m$ and the fourth minimum value $\sigma$L2$m$ are compared with each other and the smaller one is extracted as $\sigma$UL2.

Then, the extracted $\sigma$UL1 is subtracted from the extracted $\sigma$UL2, to calculate a deviation. When the deviation is positive, the adjustment phase $\theta o$ for the zero-phase-sequence voltage command Vo* is increased, and when the deviation is negative, the adjustment phase $\theta o$ is decreased.

Regarding increase/decrease of the adjustment phase $\theta o$, the adjustment phase $\theta o$ may be changed on a certain value basis, or integral control or the like may be used.

Here, with a set value provided in advance, if the deviation obtained by subtracting the extracted $\sigma$UL1 from the extracted $\sigma$UL2 is smaller than the set value, the adjustment phase $\theta o$ may be fixed without being changed. This can prevent the adjustment phase $\theta o$ from being frequently changed every time the arm voltage command VA* or the capacitor voltage sum VcA for the arm is slightly changed due to disturbance or the like, whereby the adjustment phase $\theta o$ can be reliably controlled.

In the present embodiment, as described above, by performing adjustment to increase/decrease the adjustment phase $\theta o$, phase adjustment of the zero-phase-sequence voltage command Vo* is performed. Thus, even if the capacitor voltage sum VcA pulsates, the margin of the arm voltage command VA* with respect to the output voltage range based on the capacitor voltage sum VcA can be increased, whereby utilization of DC voltage can be assuredly improved.

In addition, using instantaneous value information of the upper margins $\sigma$U and the lower margins $\sigma$L for all the arms, the adjustment phase $\theta o$ is adjusted to be increased/decreased so that the smallest margin ($\sigma$U, $\sigma$L) increases. Thus, even in a case where the three-phase balance of the AC grid 2 is lost or a case where there are variations in the main circuit constants for the arms or there are variations in the numbers of normal converter cells 11 in the arms of the power converter 10, the margins of the arm voltage commands VA* with respect to the output voltage range can be increased in the entire power conversion device 1.

In addition, in the present embodiment, on the basis of information of the first to fourth arms set in advance for each PH section, the first minimum value $\sigma$U1$m$ and the second minimum vale $\sigma$U2$m$ of the upper margins $\sigma$U and the third minimum value $\sigma$L1$m$ and the fourth minimum value $\sigma$L2$m$ of the lower margins $\sigma$L are detected, and phase adjustment of the zero-phase-sequence voltage command Vo* is performed so as to increase the margin of the arm voltage command VA* with respect to the output voltage range.

Therefore, it is not necessary to detect the local minimum values $\sigma$U$\alpha$, $\sigma$U$\beta$, $\sigma$L$\alpha$, $\sigma$L$\beta$ of the upper margin $\sigma$U and the lower margin $\sigma$L as shown in the above embodiments 1 and 2. Presence/absence or the number of the local minimum values of each of the upper margin $\sigma$U and the lower margin $\sigma$L in a range of interest is not constant, and detection for the local minimum values is performed by recognizing the crests and the troughs of the waveforms of the upper margin $\sigma$U and the lower margin $\sigma$L and therefore is complicated.

In the present embodiment, without using the local minimum values of the upper margin $\sigma$U and the lower margin $\sigma$L, phase adjustment of the zero-phase-sequence voltage command Vo* can be performed easily and reliably.

Embodiment 4

In the present embodiment, as in the above embodiment 3, on the basis of information of the first to fourth arms set in advance for each PH section, the first minimum value $\sigma$U1$m$ and the second minimum value $\sigma$U2$m$ of the upper margins $\sigma$U and the third minimum value $\sigma$L1$m$ and the fourth minimum value $\sigma$L2$m$ of the lower margins $\sigma$L are detected to perform adjustment to increase/decrease the adjustment phase $\theta o$.

In the above embodiment 3, the adjustment phase $\theta o$ is updated at the timing T for every cycle of the AC grid 2, whereas in the present embodiment, a period in which detection for the instantaneous values $\sigma$U1, $\sigma$U2, $\sigma$L1, $\sigma$L2 of the upper margins $\sigma$U and the lower margins $\sigma$L is stopped is provided and the update interval for the adjustment phase $\theta o$ is expanded.

Hereinafter, update of the adjustment phase $\theta o$ in embodiment 4 will be described on the basis of comparison with the above embodiment 3.

FIG. 19 is a waveform diagram showing phase update of the zero-phase-sequence voltage command in the power conversion device according to the above embodiment 3. FIG. 20 is a waveform diagram showing phase update of the zero-phase-sequence voltage command in the power conversion device according to embodiment 4.

The first update timing T is $\theta s+\theta v+\theta o=\pi/2$, and in the graphs, $\theta s+\theta v+\theta o$ ($\theta o=\theta 1$) before update of the adjustment phase $\theta o$ and $\theta s+\theta v+\theta o$ ($\theta o=\theta 1+\Delta\theta o$) after the update are shown.

In the above embodiment 3 shown in FIG. 19, the next update timing T is a timing at $\theta s+\theta v+\theta 1+\Delta\theta o=\pi/2+2\pi$. That is, the next update timing T is a timing at $\theta s+\theta v+\theta 1=\pi/2-$ $\Delta\theta o+2\pi$. In a case where $\Delta\theta o$ is positive, in a period 40 of $\pi/2-\Delta\theta o \leq \theta s+\theta v+\theta 1 < \pi/2$, the instantaneous values $\sigma U1$, $\sigma U2$, $\sigma L1$, $\sigma L2$ cannot be detected, and as a result, reliability of the first minimum value $\sigma U1m$ and the second minimum value $\sigma U2m$ of the upper margins $\sigma U$ and the third minimum value $\sigma L1m$ and the fourth minimum value $\sigma L2m$ of the lower margins $\sigma L$ is deteriorated.

On the other hand, in embodiment 4 shown in FIG. 20, a period 41 in which the instantaneous values $\sigma U1$, $\sigma U2$, $\sigma L1$, $\sigma L2$ are continuously detected, and a period 42 in which detection for the instantaneous values $\sigma U1$, $\sigma U2$, $\sigma L1$, $\sigma L2$ is stopped, are provided. At the timing T ($\theta s+\theta v+\theta o=\pi/2$) when the continuous detection period 41 is finished, the adjustment phase $\theta o$ is updated from $\theta 1$ to $\theta 1+\Delta\theta o$. Then, the detection stop period 42 of $\pi/2 \leq \theta s+\theta v+\theta 1 < \pi/2-\Delta\theta o+2\pi$ passes, and in the subsequent continuous detection period 41, the instantaneous values $\sigma U1$, $\sigma U2$, $\sigma L1$, $\sigma L2$ are continuously detected over one cycle until the next update timing T ($\theta s+\theta v+\theta 1=\pi/2-\Delta\theta o+4\pi$). Then, at the next update timing T, the adjustment phase $\theta o$ is updated from $\theta 1+\Delta\theta o$ to $\theta 1+\Delta\theta o+\Delta\theta oA$, thus shifting to the detection stop period 42.

FIG. 21 is a flowchart illustrating operation of the power conversion device according to embodiment 4. In this case, operation for phase adjustment of the zero-phase-sequence voltage command Vo*, i.e., calculation and update of the adjustment phase $\theta o$, by the phase adjustment unit 32 of the zero-phase-sequence voltage command generation unit 25 in the control device 20, will be described.

First, a determination signal Cal which is 0 or 1 is set to an initial value 1 (step S100).

Next, whether the determination signal Cal is 0 or 1 is determined (step S101). If the determination signal Cal is 1, the processing from step S00 to step S24 shown in the above embodiment 3 is performed to calculate and update the adjustment phase $\theta o$ on the basis of the minimum values $\sigma U1min$, $\sigma U2min$, $\sigma L1min$, $\sigma L2min$ stored in the respective PH sections (step S102), and the determination signal Cal is set to 0 (step S103), to return to step S101.

In step S101, if the determination signal Cal is 0, the PH section is set to the section at PH=0 (step S104). Then, for $\theta^*=\theta s+\theta v+\theta o$, whether PH=0 and $\theta^* \geq 5\pi/6$ are satisfied is determined, and this determination processing is repeated until the determination indicates Yes (step S105). In a case of Yes, the PH section is set to the section at PH=1 (step S106).

Then, for $\theta^*=\theta s+\theta v+\theta o$, whether PH=1 and $\theta^* \geq 7\pi/6$ are satisfied is determined, and this determination processing is repeated until the determination indicates Yes (step S107). In a case of Yes, the PH section is set to the section at PH=2 (step S108).

The above two steps of step 107 and step 108 are repeated while PH is increased by 1 for each time and the range of $\theta^*$ is also increased by $\pi/3$ for each time, until the PH section is set to the section at PH=5 (step S120). Then, for $\theta^*=\theta s+\theta v+\theta o$, whether PH=5 and $\theta^* \geq \pi/2$ is satisfied is determined, and this determination process is repeated until the determination indicates Yes (step S121). In a case of Yes, the determination signal Cal is set to 1 (step S122), to return to step S101.

As described above, using the determination signal Cal, if the determination signal Cal is 1, the continuous detection period 41 is set, and if the determination signal Cal is 0, the detection stop period 42 is set. Thus, the continuous detection period 41 for the instantaneous values $\sigma U1$, $\sigma U2$, $\sigma L1$, $\sigma L2$ can be a period that continues over one cycle, whereby the first minimum value $\sigma U1m$ and the second minimum value $\sigma U2m$ of the upper margins $\sigma U$ and the third minimum value $\sigma L1m$ and the fourth minimum value $\sigma L2m$ of the lower margins $\sigma L$ are reliably acquired and reliability of phase adjustment is improved.

In the above description, the continuous detection period 41 is set as one cycle of the AC voltage. However, the continuous detection period 41 may be a cycle that is an integer multiple of the AC voltage cycle.

If the continuous detection period 41 is present at least over one cycle of the AC voltage, the detection stop period 42 may not necessarily be provided.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 power conversion device
2 AC grid
4 DC circuit
5P, 5N DC terminal
6 AC input terminal
10 power converter
11 converter cell
24 arm voltage command generation unit
13 DC capacitor
20 control device
25 zero-phase-sequence voltage command generation unit
32 phase adjustment unit
41 continuous detection period
42 detection stop period
Pu, Nu, Pv, Nv, Pw, Nw arm
VA*, VAPu*, VANu*, VAPv*, VANv*, VAPw*, VANw* arm voltage command
Vo* zero-phase-sequence voltage command
VcA, VcAPu, VcANu, VcAPv, VcANv, VcAPw, VcANw capacitor voltage sum
$\sigma U$ upper margin
$\sigma L$ lower margin
$\sigma Umin$ minimum value of upper margin
$\sigma Lmin$ minimum value of lower margin
$\sigma U\alpha$, $\sigma U\beta$ first local minimum value
$\sigma L\alpha$, $\sigma L\beta$ second local minimum value
$\sigma U1$, $\sigma U2$ instantaneous value of upper margin
$\sigma L1$, $\sigma L2$ instantaneous value of lower margin
$\sigma U1min$ first value
$\sigma U2min$ second value
$\sigma L1min$ third value
$\sigma L2min$ fourth value
$\sigma U1m$ first minimum value
$\sigma U2m$ second minimum value
$\sigma L1m$ third minimum value σL2m fourth minimum value
θo adjustment phase
T timing of phase adjustment

The invention claimed is:

1. A power conversion device comprising:
a power converter for performing power conversion between a DC circuit and a three-phase AC circuit; and
a control circuitry for performing output control of the power converter, wherein
the power converter includes, for each phase of the three-phase AC circuit, two arms provided between common DC terminals and connected to each other, a connection portion therebetween being connected to the corresponding phase of the three-phase AC circuit, each of the arms being formed by connecting, in series, a plurality of converter cells each composed of a plurality of semiconductor switching elements and a DC capacitor, and
the control circuitry includes a voltage command generation circuitry which generates, for each of the arms of the power converter, an output voltage command for the plurality of converter cells, and the control circuitry generates, for each of the arms, a base command for output voltage of the plurality of converter cells, performs phase adjustment of a zero-phase-sequence voltage command having a frequency component that is three times a fundamental frequency of the three-phase AC circuit on the basis of voltage of the DC capacitor and the output voltage command, and superimposes the phase-adjusted zero-phase-sequence voltage command on the base command, thus generating the output voltage command,
wherein
the control circuitry calculates each control margin for each of at least one of the arms by subtracting the output voltage command for the arm from a voltage sum of a plurality of the DC capacitors in the arm, compares a minimum value of the control margin and a minimum value of the output voltage command in one cycle of AC voltage, and performs phase adjustment of the zero-phase-sequence voltage command so that a smaller one of the minimum values increases.

2. The power conversion device according to claim 1, wherein
the control circuitry detects, in one cycle of the AC voltage, a first local minimum value that can become the minimum value of the control margin for the arm and a second local minimum value that can become the minimum value of the output voltage command, and performs phase adjustment of the zero-phase-sequence voltage command on the basis of the detected first local minimum value and the detected second local minimum value.

3. The power conversion device according to claim 2, wherein
in one cycle of the AC voltage, there is at least one of the first local minimum values in a first half cycle and there is at least one of the second local minimum values in a second half cycle, and
the control circuitry extracts, from the first local minimum value and the second local minimum value, a third local minimum value that is smallest in a range of a first half of the first half cycle and a first half of the second half cycle, and a fourth local minimum value that is smallest in a range of a second half of the first half cycle and a second half of the second half cycle, and performs phase adjustment of the zero-phase-sequence voltage command on the basis of a deviation between the third local minimum value and the fourth local minimum value.

4. The power conversion device according to claim 3, wherein
the control circuitry detects the first local minimum values and the second local minimum values for all the arms, respectively, and extracts one said third local minimum value and one said fourth local minimum value from the detected first local minimum values and the detected second local minimum values.

5. The power conversion device according to claim 4, wherein
the third local minimum value increases with increase in a phase of the zero-phase-sequence voltage command, and the fourth local minimum value increases with decrease in the phase of the zero-phase-sequence voltage command.

6. The power conversion device according to claim 5, wherein
the control circuitry does not change a phase of the zero-phase-sequence voltage command when the deviation between the third local minimum value and the fourth local minimum value is smaller than a set value.

7. The power conversion device according to claim 4, wherein
the control circuitry does not change a phase of the zero-phase-sequence voltage command when the deviation between the third local minimum value and the fourth local minimum value is smaller than a set value.

8. The power conversion device according to claim 3, wherein
the third local minimum value increases with increase in a phase of the zero-phase-sequence voltage command, and the fourth local minimum value increases with decrease in the phase of the zero-phase-sequence voltage command.

9. The power conversion device according to claim 8, wherein
the control circuitry does not change a phase of the zero-phase-sequence voltage command when the deviation between the third local minimum value and the fourth local minimum value is smaller than a set value.

10. The power conversion device according to claim 3, wherein
the control circuitry does not change a phase of the zero-phase-sequence voltage command when the deviation between the third local minimum value and the fourth local minimum value is smaller than a set value.

11. The power conversion device according to claim 1, wherein
the control circuitry
calculates the control margin for each of the arms,
in each of six sections obtained by dividing one cycle of the AC voltage, sets, in advance, a first arm and a second arm for which the control margin can become the minimum value in the one cycle of the AC voltage, and a third arm and a fourth arm for which the output voltage command can become the minimum value in the one cycle of the AC voltage, among the plurality of arms,
in each of the sections, detects the control margin for the first arm and defines the minimum value thereof as a first value, detects the control margin for the second arm and defines the minimum value thereof as a second value, detects the output voltage command for the third arm and defines the minimum value thereof as a third value, and detects the output voltage command for the fourth arm and defines the minimum value thereof as a fourth value, and at a set phase of the AC voltage, performs phase adjustment of the zero- phase-sequence voltage command on the basis of the first to fourth values.

12. The power conversion device according to claim 11, wherein among the first to fourth arms set in each of the sections,
for the first arm, the control margin in the section increases with increase in a phase of the zero-phase-sequence voltage command,
for the second arm, the control margin in the section increases with decrease in the phase of the zero-phase-sequence voltage command,
for the third arm, the output voltage command in the section increases with increase in the phase of the zero-phase-sequence voltage command, and
for the fourth arm, the output voltage command in the section increases with decrease in the phase of the zero-phase-sequence voltage command, and
the control circuitry
defines respective minimum values of the first values, the second values, the third values, and the fourth values in all the six divided sections, as a first minimum value, a second minimum value, a third minimum value, and a fourth minimum value, and
extracts a smaller one of the first minimum value and the third minimum value, and a smaller one of the second minimum value and the fourth minimum value, and performs phase adjustment of the zero-phase-sequence voltage command on the basis of a deviation between the two extracted values.

13. The power conversion device according to claim 12, wherein
the control circuitry does not change the phase of the zero-phase-sequence voltage command when the deviation is smaller than a set value.

14. The power conversion device according to claim 13, wherein
in a continuous detection period until a phase adjustment time point, the control circuitry detects the control margins for the first and second arms and the output voltage commands for the third and fourth arms, and the continuous detection period is at least one cycle of the AC voltage.

15. The power conversion device according to claim 14, wherein
the control circuitry sets the continuous detection period to be an integer multiple of a cycle of the AC voltage, and provides a period in which detection for the control margins for the first and second arms and the output voltage commands for the third and fourth arms is stopped from a previous phase adjustment time point until a start time point of the continuous detection period.

16. The power conversion device according to claim 12, wherein
in a continuous detection period until a phase adjustment time point, the control circuitry detects the control margins for the first and second arms and the output voltage commands for the third and fourth arms, and the continuous detection period is at least one cycle of the AC voltage.

17. The power conversion device according to claim 16, wherein
the control circuitry sets the continuous detection period to be an integer multiple of a cycle of the AC voltage, and provides a period in which detection for the control margins for the first and second arms and the output voltage commands for the third and fourth arms is stopped from a previous phase adjustment time point until a start time point of the continuous detection period.

18. The power conversion device according to claim 11, wherein
in a continuous detection period until a phase adjustment time point, the control circuitry detects the control margins for the first and second arms and the output voltage commands for the third and fourth arms, and the continuous detection period is at least one cycle of the AC voltage.

19. The power conversion device according to claim 18, wherein
the control circuitry sets the continuous detection period to be an integer multiple of a cycle of the AC voltage, and provides a period in which detection for the control margins for the first and second arms and the output voltage commands for the third and fourth arms is stopped from a previous phase adjustment time point until a start time point of the continuous detection period.

* * * * *